United States Patent [19]
Ishino et al.

[11] Patent Number: 5,473,541
[45] Date of Patent: Dec. 5, 1995

[54] STEERING CONTROL SYSTEM FOR USE IN A TRACK-LAYING VEHICLE

[75] Inventors: Tsutomu Ishino; Ryoichi Maruyama; Hideki Yamada, all of Komatsu, Japan

[73] Assignee: Kabushiki Kaisha Komatsu Seisakusho, Tokyo, Japan

[21] Appl. No.: 268,934

[22] Filed: Jun. 30, 1994

[30] Foreign Application Priority Data

Jul. 14, 1993 [JP] Japan ................. 5-174376
Jun. 2, 1994 [JP] Japan ................. 6-121497

[51] Int. Cl.⁶ ........................................ B62D 11/10
[52] U.S. Cl. .................. 364/424.07; 364/424.05; 180/6.7; 477/1
[58] Field of Search ............... 364/424.01, 424.07, 364/426.01, 565; 180/6.2, 6.44, 6.48, 6.5, 6.7, 9.1, 9.21, 9.44; 477/1

[56] References Cited

U.S. PATENT DOCUMENTS

| | | | |
|---|---|---|---|
| 4,043,227 | 8/1977 | Beals et al. | 74/868 |
| 4,068,543 | 1/1978 | Sakai et al. | 74/866 |
| 4,309,917 | 1/1982 | Leet | 74/861 |
| 4,434,680 | 3/1984 | Riediger et al. | 74/682 |
| 4,699,239 | 10/1987 | Ishino et al. | 180/315 |
| 4,754,824 | 7/1988 | Olsson | 180/6.48 |
| 4,882,947 | 11/1989 | Barnard | 74/687 |
| 4,917,200 | 4/1990 | Lucius | 180/6.2 |
| 5,285,861 | 2/1994 | Nakamura | 180/6.44 |

FOREIGN PATENT DOCUMENTS 63-30654   2/1988   Japan .

*Primary Examiner*—Michael Zanelli
*Attorney, Agent, or Firm*—Armstrong, Westerman Hattori, McLeland & Naughton

[57] ABSTRACT

A steering control system for use in a track-laying vehicle comprising: a power source; a steering motor driven by the rotation of the power source, for driving crawler belts provided at both sides of the vehicle such that a relative travel difference is caused between the crawler belts, thereby turning the vehicle rightwards or leftwards; a steering instructing device which can be displaced from a neutral position by operation and which instructs, according to the direction and distance of its displacement, a turning direction and a turning radius for the vehicle, the turning radius decreasing as the displacement distance increases; a displacement detector for detecting the displacement of the steering instructing device; and a steering motor revolution speed control unit for obtaining a target steering motor revolution speed which is made proportional to the revolution speed of the power source based on the displacement of the steering instructing device detected by the displacement detector and controlling the revolution speed of the steering motor with the target steering motor revolution speed.

17 Claims, 9 Drawing Sheets

STEERING CONTROL SYSTEM FOR USE IN A TRACK-LAYING VEHICLE

BACKGROUND OF THE INVENTION

1. Field of the Invention

The present invention relates to a steering control system for use in a track-laying vehicle and, more particularly, to a steering control system for use in a track-laying vehicle such as a bulldozer, power shovel or crane which is most suitably applied to a steering control system in which a steering motor driven by the rotation of a power source drives crawler belts provided at both sides of the vehicle such that a relative travel difference is caused between the crawler belts, thereby turning the vehicle rightwards or leftwards.

2. Description of the Prior Art

In a prior art steering control system for the above-type track-laying vehicle, the revolution speed of the steering motor is unitarily determined and varied according to the displacement distance of a steering lever alone, regardless of the revolution speed of the power source. Such a steering lever is one form of a steering instructing means which can be displaced from a neutral position by operation and which instructs, according to the direction and distance of its displacement, a turning direction and a turning radius for the vehicle, the turning radius decreasing as the displacement distance increases.

SUMMARY OF THE INVENTION

In the above-described steering control system, when the revolution speed of the power source for driving the steering motor is high, the maximum revolution speed of the steering motor can be made satisfactorily high, and therefore the revolution speed of the steering motor can be varied throughout the entire operating range of the steering lever. On the other hand, when the revolution speed of the power source is low, the steering motor reaches its maximum revolution speed on halfway in the operating range of the steering lever, that is, the maximum revolution speed of the steering motor cannot be made high enough to allow the revolution speed of the steering motor to be varied throughout the entire operating range, so that high accuracy cannot be ensured in turning the vehicle.

The invention has been made to overcome the foregoing disadvantage and therefore one of the objects of the invention is to provide a steering control system for use in a track-laying vehicle, in which the revolution speed of the steering motor can be varied throughout the entire operating range of the steering instructing means regardless of the revolution speed of the power source, so that high accuracy can be achieved in turning the vehicle.

In order to accomplish the foregoing object, a steering control system for use in a track-laying vehicle according to the invention comprises:

(a) a power source;

(b) a steering motor driven by the rotation of the power source, for driving crawler belts provided at both sides of the vehicle such that a relative travel difference is caused between the crawler belts, thereby turning the vehicle rightwards or leftwards;

(c) steering instructing means which can be displaced from a neutral position by operation and which instructs, according to the direction and distance of its displacement, a turning direction and a turning radius for the vehicle, the turning radius decreasing as the displacement distance increases;

(d) displacement detector means for detecting the displacement of the steering instructing means; and (e) steering motor revolution speed control means for obtaining a target steering motor revolution speed which is made proportional to the revolution speed of the power source based on the displacement of the steering instructing means detected by the displacement detector means and controlling the revolution speed of the steering motor with the target steering motor revolution speed.

According to the invention, the revolution speed of the steering motor driven by the rotation of the power source is controlled with a target steering motor revolution speed which is made proportional to the revolution speed of the power source based on the displacement of the steering instructing means. This allows the revolution speed of the steering motor to be varied throughout the entire operating range of the steering instructing means, so that high-accuracy vehicle turning operation can be achieved.

The way for obtaining the target steering motor revolution speed which is made proportional to the revolution speed of the power source based on the displacement of the steering instructing means is as follows: Power source revolution speed detector means for detecting the actual revolution speed of the power source is employed. Based on the displacement of the steering instructing means detected by the displacement detector means, a target steering motor speed ratio which is the ratio of a target revolution speed for the steering motor to the revolution speed of the power source is obtained. Then, the target steering motor speed ratio is multiplied by the actual revolution speed of the power source.

A target revolution speed for the power source may be set according to a throttle position detected by throttle position detector means for detecting the position of a throttle with respect to the power source.

The steering motor may be, for example, a hydrostatic steering motor or electric steering motor which is rotated by the power source in forward and reverse directions, thereby driving the crawler belts at the same speed in different directions such that a relative travel difference is caused between the crawler belts. The rotary driving force of the power source is transmitted through a non-stage transmission such as a hydrostatic-mechanical transmission, hydrostatic transmission or belt-type transmission, such that the crawler belts are driven at the same speed in the same direction, thereby driving the vehicle forwards or backwards. The steering instructing means may be, for example, a steering lever or steering handle.

Other objects of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and accompanying drawings which are given by way of illustration only, and thus are not limitative of the present invention, and wherein:

FIG. 1 is a view showing the external appearance of the bulldozer;

FIG. 2 is a schematic block diagram showing the overall construction of a power transmission system;

FIG. 3 is a graph in which a characteristic curve of a transmission motor speed ratio is plotted against a transmission revolution speed ratio;

FIG. 4 is a schematic diagram illustrating the operation of a steering lever;

FIG. 5 is a flowchart of a program;

FIG. 6 is a graph in which a characteristic curve of a target engine revolution speed is plotted against the position of a throttle;

FIG. 7 is a graph in which a characteristic curve of an actual transmission motor speed ratio is plotted against an actual transmission revolution speed ratio;

FIG. 8 is a graph in which a characteristic curve of a target steering motor speed ratio is plotted against the displacement of the steering lever;

FIG. 9 is a graph of a parameter;

FIG. 10 is a graph in which a characteristic curve of a target steering motor revolution speed which specifies a rotating direction is plotted against a solenoid control current;

FIG. 11 is a graph in which a maximum target transmission revolution speed ratio is plotted against the absolute value of the displacement of the steering lever;

FIG. 12 is a graph in which a characteristic curve of a target transmission motor speed ratio is plotted against a target transmission revolution speed ratio.

PREFERRED EMBODIMENTS OF THE INVENTION

With reference to the drawings, a preferred embodiment in which a steering control system for use in a track-laying vehicle according to the invention is applied to a bulldozer will be hereinafter described.

Figure 1:
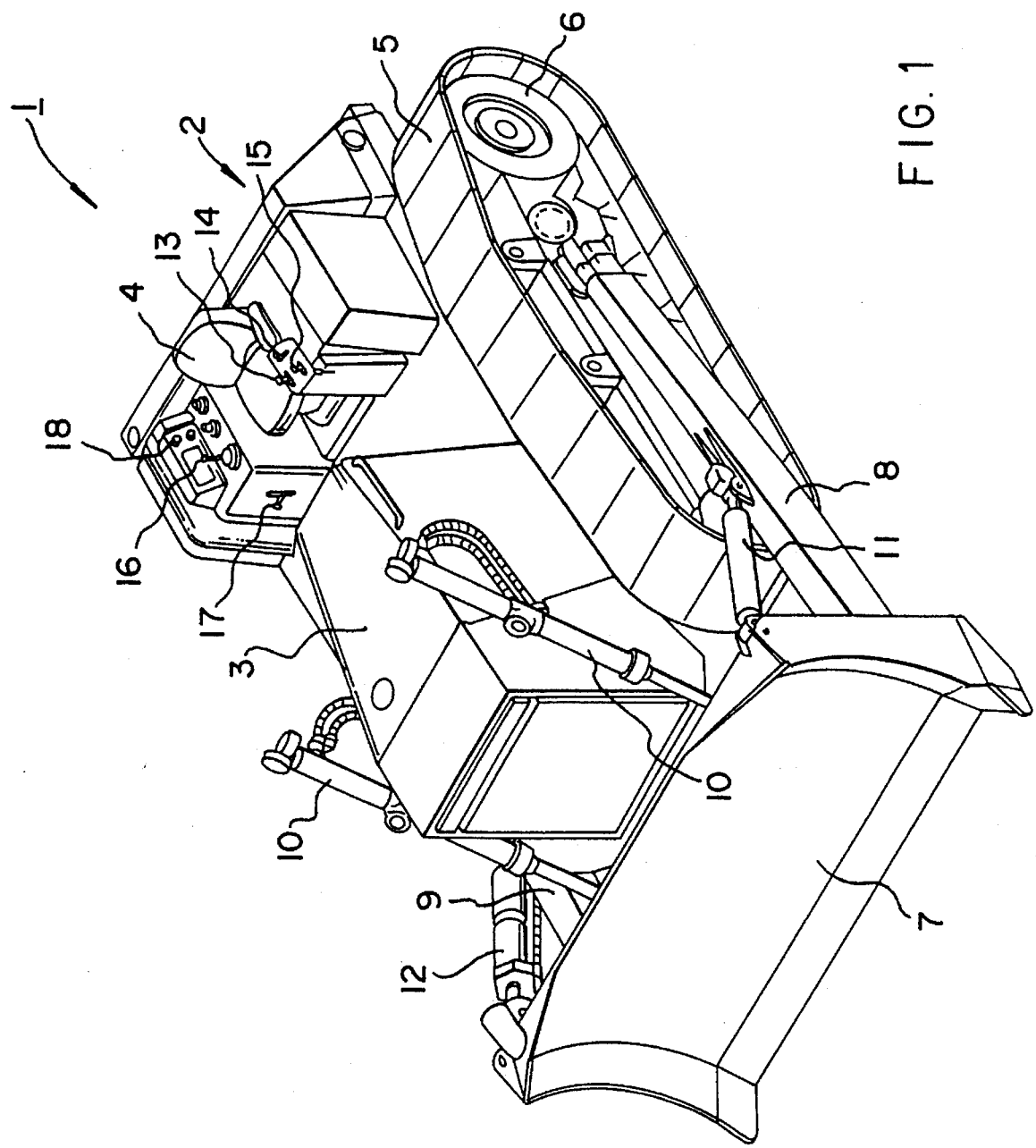
FIGS. 1 to 12 illustrate a preferred embodiment in which a steering control system for use in a track-laying vehicle according to the invention is applied to a bulldozer.

Referring to FIG. 1, there is shown the external appearance of a bulldozer 1 which is provided with, on a vehicle body 2 thereof, a bonnet 3 for housing an engine (not shown) and an operator seat 4 for the operator who drives the bulldozer 1. Both sides of the vehicle body 2 are provided with crawler belts 5 for running the vehicle body 2 so as to turn or move back and forth. These crawler belts 5 are independently driven by their respective sprockets 6 actuated by rotary driving force transmitted from the engine. Note that the crawler belt 5 and the sprocket 6 on the right side are not shown in the drawing. There are provided right and left straight frames 8, 9 for supporting a blade 7 at the forward ends thereof. The base ends of these right and left straight frames 8, 9 are pivotally supported at the right and left sides of the vehicle body 2 in such a manner that the blade 7 can be lifted or lowered. Reference numeral 10 denotes right and left blade lift cylinders for lifting or lowering the blade 7. Reference numerals 11 and 12 denote a pair of braces and a blade tilt cylinder respectively, and they are provided for tilting the blade 7 laterally.

There are provided, on the left of the operator seat 4, an engine throttle lever 13 operated in forward and backward directions; a steering lever 14 operated rightwards or leftwards when turning the vehicle body 2 rightwards or leftwards; and a forward/reverse drive switch lever 15 operated in forward and backward directions to take a forward position F, neutral position N or reverse position R when driving the vehicle body 2 forwards, backwards or stopping etc. it. On the right of the operator seat 4, a blade control lever 16 operated in forward/backward and lateral directions when lifting and lowering the blade 7 or tilting it to the right or left; a parking brake 17 operated in upward and downward directions; and a measuring instrument 18 or other devices. Although they are not shown in the drawing, a brake pedal and a decelerator pedal are disposed in front of the operator seat 4.

Figure 2:
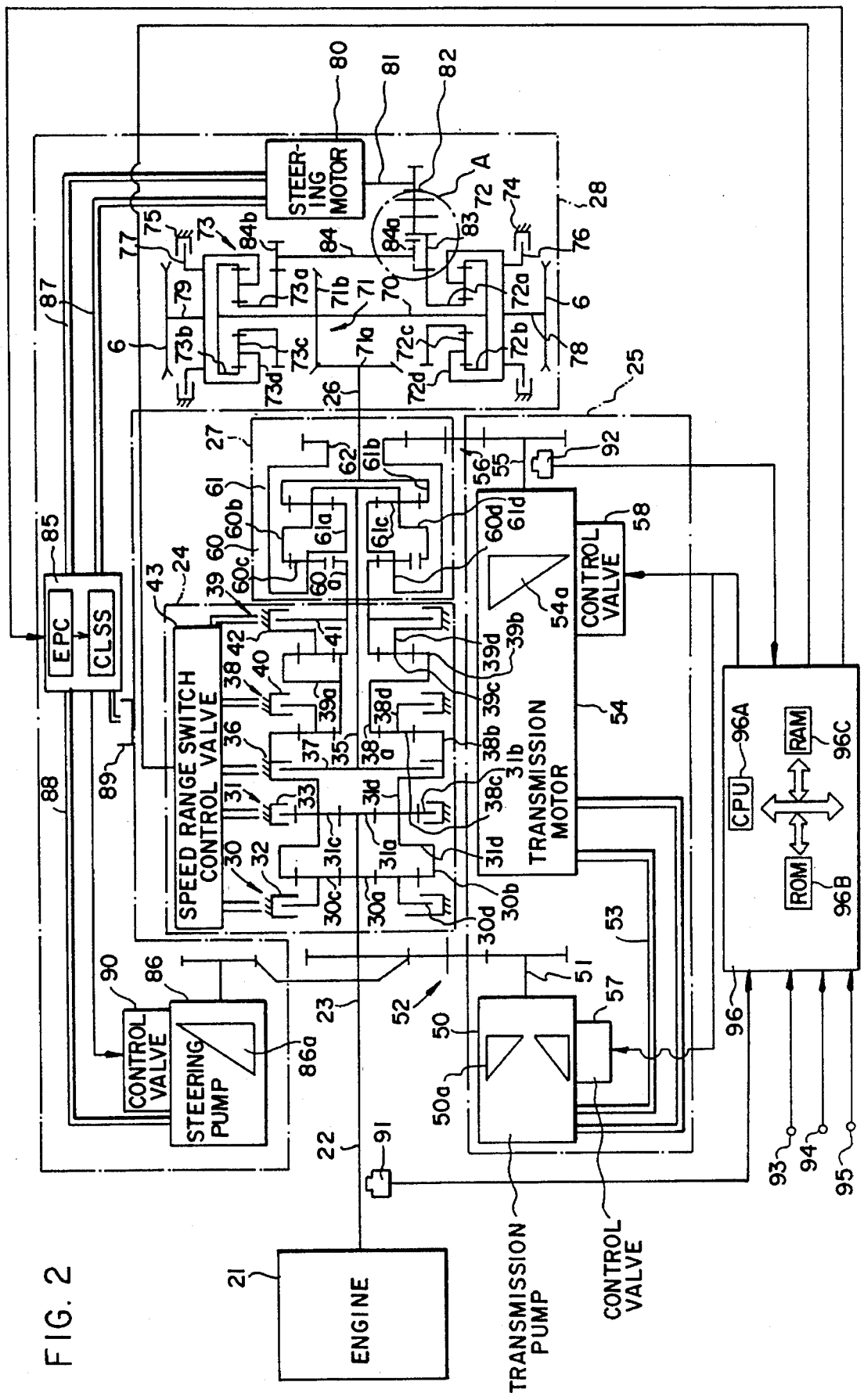

In FIG. 2 which shows a power transmission system, there are juxtaposed a mechanical transmission unit 24 and a hydrostatic transmission unit 25 with respect to a transmission input shaft 23 that is integrally and coaxially coupled to an engine output shaft 22 of an engine 21, so that power transmitted from the engine 21 is split. The mechanical transmission unit 24 and the hydrostatic transmission unit 25 constitute a hydrostatic-mechanical transmission called "non-stage transmission" for providing three drive ranges in forward and reverse, respectively. A differential unit 27 also constitutes the hydrostatic-mechanical transmission and is disposed in relation to the mechanical transmission unit 24 and the hydrostatic transmission unit 25, for transmitting rotary drive force to a transmission output shaft 26 with the output shaft 26 being selectively coupled to both the mechanical transmission unit 24 and the hydrostatic transmission unit 25 or to the hydrostatic transmission unit 25 only. The transmission output shaft 26 is connected to a steering unit 28 which constitutes a hydrostatic steering system called "non-stage steering system".

The mechanical transmission unit 24, hydrostatic transmission unit 25 and differential unit 27 which constitute the hydrostatic-mechanical transmission and the steering unit 28 which constitutes the hydrostatic steering system will be hereinafter described in that order.

(1) Mechanical transmission unit 24

In FIG. 2, the transmission input shaft 23 is provided with a reverse planetary gear train 30 and a forward planetary gear train 31. The gear trains 30 and 31 are of single planetary type and are aligned in an axial direction of the transmission input shaft 23 in this order when enumerating from the left in FIG. 2. The reverse planetary gear train 30 is composed of a sun gear 30a integrally formed with the transmission input shaft 23; a ring gear 30b positioned outside the sun gear 30a; a planet gear 30c that is in mesh with the gears 30a and 30b, being positioned therebetween; and a planet carrier 30d that is for the planet gear 30c and can be hydraulically braked by a reverse hydraulic clutch 32. Similarly, the forward planetary gear train 31 is composed of a sun gear 31a integrally formed with the transmission input shaft 23; a ring gear 31b that is positioned outside the sun gear 31a and can be hydraulically braked by a forward hydraulic clutch 33; a planet gear 31c that is in mesh with the gears 31a and 31b, being positioned therebetween; and a planet carrier 31d that is for the planet gear 31c and is integral with the ring gear 30b of the reverse planetary gear train 30.

There is provided an intermediate shaft 35 positioned coaxially with and in an extending direction of the transmission input shaft 23. In FIG. 2, the intermediate shaft 35 is provided, at the left end thereof, with a clutch board 37 that is hydraulically connectable by a 2nd-speed hydraulic clutch 36. The 2nd-speed hydraulic clutch 36 is formed integrally with the planet carrier 31d of the forward planetary gear train 31. The intermediate shaft 35 is also provided with a first 3rd-speed planetary gear train 38 and a second 3rd-speed planetary gear train 39. The gear trains 38 and 39 are of the single planetary type and are aligned in an axial direction of the intermediate shaft 35 in this order when enumerating from the left in FIG. 2. The first 3rd-speed planetary gear train 38 is composed of a sun gear 38a rotatably supported by the intermediate shaft 35; a ring gear 38b that is positioned outside the sun gear 38a, being integral with the planet carrier 31d of the forward planetary gear train 31 and the 2nd-speed hydraulic clutch 36; a planet gear 38c that is in mesh with the gears 38a and 38b, being positioned therebetween; and a planet carrier 38d that is for the planet gear 38c and can be hydraulically braked by a 3rd-speed hydraulic clutch 40. Similarly, the second 3rd-speed planetary gear train 39 is composed of a sun gear 39a that is rotatably supported by the intermediate shaft 35, being integral with a clutch board 41; a ring gear 39b that is positioned outside the sun gear 39a, being integral with the sun gear 38a of the first 3rd-speed planetary gear train 38; a planet gear 39c that is in mesh with the gears 39a and 39b, being positioned therebetween; and a fixed planet carrier 39d that is for the planet gear 39c and is integral with a 1st-speed hydraulic clutch 42 hydraulically connectable to the clutch board 41.

Reference numeral 43 denotes a speed range switch control valve. In this embodiment, the valve 43 comprises of an electromagnetic solenoid valve for performing the switch control of the reverse hydraulic clutch 32, the forward hydraulic clutch 33, the 2nd-speed hydraulic clutch 36, the 3rd-hydraulic clutch 40 and the 1st-speed hydraulic clutch 42.

(2) Hydrostatic transmission unit 25

A pump input shaft 51 of a transmission pump 50 is coupled to the transmission input shaft 23 through a gear train 52. The transmission pump 50 is a variable displacement hydraulic pump having a discharge setting variable-angle swash plate 50a which swings both in the positive and negative directions. The transmission pump 50 is connected, through a pair of conduits 53 comprising of an outgoing path and a return path, to a transmission motor 54. The transmission motor 54 is a variable displacement hydraulic motor having a discharge setting variable-angle swash plate 54a which swings in one direction. A motor output shaft 55 of the transmission motor 54 is coupled to a gear train 56. The discharge setting variable-angle swash plates 50a and 54a provided in the transmission pump 50 and the transmission motor 54 are designed such that the revolution speed of the transmission pump 50 and that of the transmission motor 54 vary according to variations in the angles of the discharge setting variable-angle swash plates 50a and 54a, as described below.

The revolution speed of the transmission pump 50 is specified, and the discharge setting variable-angle swash plate 54a of the transmission motor 54 is inclined at a maximum tilt angle. In this condition, as the tilt angle of the discharge setting variable-angle swash plate 50a of the transmission pump 50 increases from zero in the positive direction, the revolution speed of the transmission motor 54 increases from zero in the positive direction. Then, the tilt angle of the discharge setting variable-angle swash plate 50a of the transmission pump 50 is set to a maximum positive value. In this condition, as the tilt angle of the discharge setting variable-angle swash plate 54a of the transmission motor 54 decreases, the revolution speed of the transmission motor 54 further increases in the positive direction.

On the other hand, as the tilt angle of the discharge setting variable-angle swash plate 50a of the transmission pump 50 increases from zero in the negative direction with the discharge setting variable-angle swash plate 54a of the transmission motor 54 being inclined at a maximum tilt angle, the revolution speed of the transmission motor 54 increases from zero in the negative direction. Then, the tilt angle of the discharge setting variable-angle swash plate 50a of the transmission pump 50 is set to a maximum negative value. In this condition, as the tilt angle of the discharge setting variable-angle swash plate 54a of the transmission motor 54 decreases, the revolution speed of the transmission motor 54 further increases in the negative direction.

Reference numeral 57 denotes an angular displacement control valve. In this embodiment, the angular displacement control valve 57 comprises of an electromagnetic solenoid valve for performing the angular displacement control of the discharge setting variable-angle swash plate 50a of the transmission pump 50. Reference numeral 58 denotes another angular displacement control valve. In this embodiment, the angular displacement control valve 58 comprises of an electromagnetic solenoid valve for performing the angular displacement control of the discharge setting variable-angle swash plate 54a of the transmission pump 54.

(3) Differential unit 27

In FIG. 2, the intermediate shaft 35 is provided, at the right end, with a first differential planetary gear train 60 of the double planetary type and a second differential planetary gear train 61 of the single planetary type. These gear trains 60 and 61 are aligned coaxially with and in an extending direction of the intermediate shaft 35 in this order when enumerating from the left in FIG. 2. The first differential planetary gear train 60 is composed of a sun gear 60a that is rotatably supported by the intermediate shaft 35, being integral with the sun gear 39a of the second 3rd-speed planetary gear train 39 and the clutch board 41; a ring gear 60b positioned outside the sun gear 60a; a planet gear 60c that is in mesh with both of the gears 60a and 60b, being positioned therebetween; and a planet carrier 60d that is for the planet gear 60c and is integral with an input gear 62 coupled through the gear train 56 to the motor output shaft 55 of the transmission motor 54 in the hydrostatic transmission unit 25. Similarly, the second differential planetary gear train 61 is composed of a sun gear 61a that is rotatably supported by the intermediate shaft 35, being integral with the planet carrier 60d of the first differential planetary gear train 60; a ring gear 61b that is positioned outside the sun gear 61a, being integral with the transmission output shaft 26 positioned (at the right hand in FIG. 2) coaxially with and in an extending direction of the intermediate shaft 35; a planet gear 61c that is in mesh with the gears 61a and 61b, being positioned therebetween; and a planet carrier 61d that is for the planet gear 61c and is integral with the ring gear 60b of the first differential planetary gear train 60 and the intermediate shaft 35.

(4) Steering unit 28

Figure 2A:
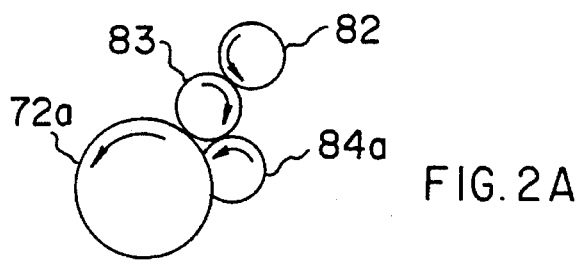
FIG. 2A is a schematic elevation showing certain gears of the steering system of FIG. 2.

A main steering shaft 70, which makes a right angle with the transmission output shaft 26, is coupled to the transmission output shaft 26 through a bevel gear mechanism 71. The bevel gear mechanism 71 is composed of a first bevel gear 71a that is integral with the transmission output shaft 26; and a second bevel gear 71b that is in mesh with the first bevel gear 71a and integral with the main steering shaft 70. Provided at both sides of the main steering shaft 70 are a first differential planetary gear train 72 and a second differential planetary gear train 73. These first and second differential planetary gear trains 72, 73 are composed of sun gears 72a, 73a rotatably supported by the main steering shaft 70; ring gears 72b, 73b that are positioned outside the sun gears 72a, 73a respectively, being integral with the main steering shaft 70; planet gears 72c, 73c that are in mesh with the gears 72a, 72b; and the gears 73a, 73b respectively, being positioned therebetween; and planet carriers 72d, 73d that are for the planet gears 72c, 73c and that are integral with brake plates 76, 77 of brakes 74, 75 and with steering output shafts 78, 79. The sun gear 72a at the left hand is coupled to a motor output shaft 81 of a steering motor 80 (which is a hydraulic motor) through an intermediate gear 83. As shown in FIG. 2A, the intermediate gear 83 is disposed between and in mesh with the sun gear 72a and a gear train 82 which is coupled to the motor output shaft 81 of the steering motor 80. The other sun gear 73a at the right hand is coupled to the motor output shaft 81 through a sub steering shaft 84. The sub steering shaft 84 is disposed between the sun gear 73a and the gear train 82 and includes a first gear 84a and a second gear 84b, these gears 84a, 84b being integral with the sub steering shaft 84. The second gear 84b is in mesh with the sun gear 73a while the first gear 84a being in mesh with the gear train 82, whereby coupling between the sun gear 73a and the motor output shaft 81 is established. With the above arrangement, the sun gears 72a, 73a are actuated reversely relative to each other by means of the steering motor 80.

The steering motor 80 is connected through a flow/flowing direction control valve 85 to a steering pump 86 which is a variable displacement steering hydraulic pump with a discharge setting variable-angle swash plate 86a swinging in one direction. The flow/flowing direction control valve 85 of this embodiment is composed of an EPC valve (Electric Proportional Control Valve) which is an electromagnetic solenoid valve and a CLSS valve (Closed Center Lord Sensing System Valve) which is an pressure control valve. Specifically, a pair of conduits 87 comprising of an outgoing path and a return path extend between the steering motor 80 and the flow/flowing direction control valve 85, and a pair of conduit 88 extends between the flow/flowing direction control valve 85 and the steering pump 86, whereby the connection between the steering motor 80 and the steering pump 86 is established. The flow/flowing direction control valve 85 controls the flow of pressure oil which flows from the steering pump 86 through the conduit 88; which is supplied to the steering motor 80 though the pair of conduits 87 comprising of the outgoing and return paths; and which is discharged to a reservoir 89. With this flow control, the revolution speed of the steering motor 80 is adjusted. The flow/flowing direction control valve 85 also controls the flowing direction of pressure oil supplied to the pair of conduits 87 by switching between the outgoing path and return path, whereby the direction (forward or reverse) of the steering motor 80 is determined. Reference numeral 90 denotes an angular displacement control valve for performing the angular displacement control of a discharge setting variable-angle swash plate 86a of the steering pump 86. The angular displacement control valve 90 is an electromagnetic solenoid valve in this embodiment and performs the angular displacement control of the discharge setting variable-angle swash plate 86a such that the difference between the oil pressures at the inlet and outlet of the flow/flowing direction control valve 85 has a predetermined value.

Figure 3:
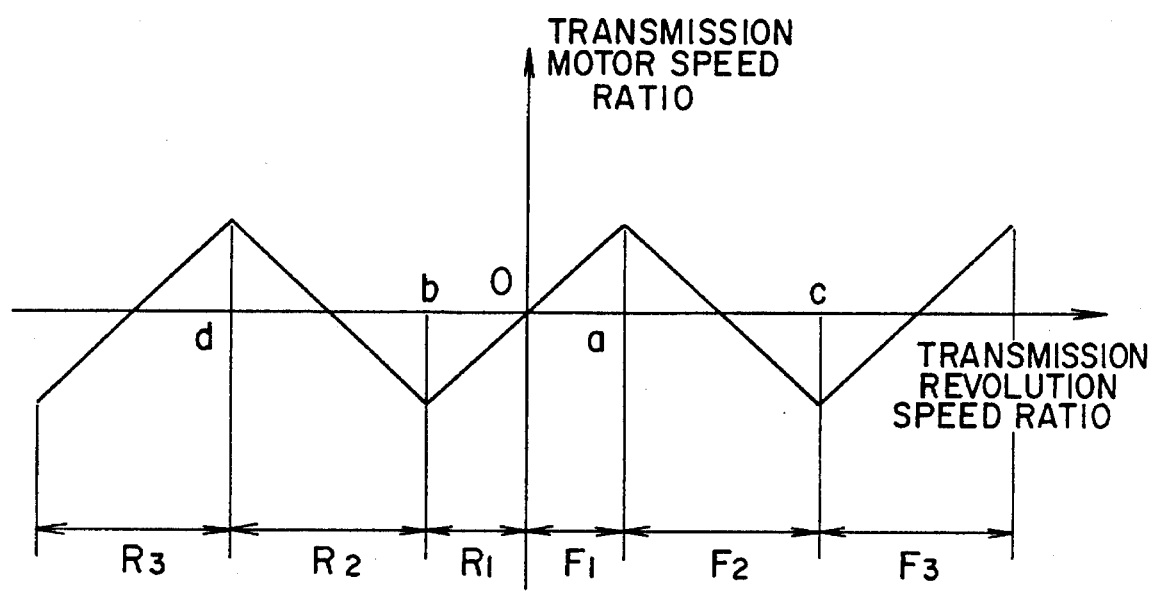

There will be given an explanation on the mechanical operations of the mechanical transmission unit 24, the hydrostatic transmission unit 25, the differential unit 27 and the steering unit 28. FIG. 3 shows the relationship between transmission revolution speed ratio and transmission motor speed ratio in the respective speed ranges (i.e., 1st forward speed F1; 2nd forward speed F2; 3rd forward speed F3; 1st reverse speed R1; 2nd reverse speed R2; and 3rd reverse speed R3). The transmission revolution speed ratio is the ratio of the revolution speed of the transmission output shaft 26 to the revolution speed of the engine output shaft 22 of the engine 21 (=the revolution speed of the engine). The transmission motor speed ratio is the ratio of the revolution speed of the motor output shaft 55 of the transmission motor 54 (=the revolution speed of the motor) to the revolution speed of the engine output shaft 22 of the engine 21 (=the revolution speed of the engine).

(i) 1st forward speed F1 and 1st reverse speed R1:

Only the 1st-speed hydraulic clutch 42 is engaged. The engagement of the clutch 42 causes the sun gear 60a of the first differential planetary gear train 60 to be hydraulically braked through the clutch board 41 and tile intermediate shaft 35 to be in a freely rotated state. Accordingly, only the torque of the transmission motor 54 in the hydrostatic transmission unit 25 is transmitted to the motor output shaft 55 of the transmission motor 54; the gear train 56; the input gear 62 and the planet carrier 60d, the planet gear 60c and the ring gear 60b of the first differential planetary gear train 60 in the differential unit 27; the planet carrier 61d, the planet gear 61c and the ring gear 61b of the second differential gear train 61 in the differential unit 27; and the transmission output shaft 26 in that order. In short, the transmission output shaft 26 is rotated, being coupled only to the hydrostatic transmission unit 25 by means of the differential unit 27.

As the transmission motor speed ratio is thus increased from zero in the positive direction, the revolution speed of the transmission output shaft 26 increases from zero in the positive direction. On the other hand, as the transmission motor speed ratio increases from zero in the negative direction, the revolution speed of the transmission output shaft 26 also increases from zero in the negative direction. Thus, the transmission revolution speed ratio may be infinitely varied both in the positive and negative directions within a specified range.

In 1st forward speed F1 and 1st reverse speed R1, the 2nd-speed hydraulic clutch 36 may be engaged or may be disengaged. However, when taking into account the case that the clutch 36 may be shifted into 2nd forward speed F2 or 2nd reverse speed R2, the 2nd-speed hydraulic clutch 36 is preferably engaged.

In 1st speed, when the revolution speed of the transmission output shaft 26 increases in the positive direction and the transmission revolution speed ratio is a specified positive value a, the relative revolution speed of the forward hydraulic clutch 33 in relation to the ring gear 31b of the forward planetary gear train 31 becomes zero. In this condition, if the forward hydraulic clutch 33 is engaged and the 1st-speed hydraulic clutch 42 is disengaged, 2nd forward speed F2 will be established. At that time, the 2nd-speed hydraulic clutch 36 has been engaged.

In 1st speed, when the revolution speed of the transmission output shaft 26 increases in the negative direction and the transmission revolution speed ratio is a specified negative value b, the relative revolution speed of the reverse hydraulic clutch 32 in relation to the planet carrier 30d of the reverse planetary gear train 30 becomes zero. In this condition, if the reverse hydraulic clutch 32 is engaged and the 1st-speed hydraulic clutch 42 is disengaged, 2nd reverse speed R2 will be established. At that time, the 2nd-speed hydraulic clutch 36 has been engaged.

(ii) Second forward speed F2

Since the clutch board 37 is hydraulically coupled by the engagement of the 2nd-speed hydraulic clutch 36 and the ring gear 31b of the forward planetary gear train 31 is hydraulically braked by the engagement of the forward hydraulic clutch 33, the torque of the transmission input shaft 23 is transmitted to the forward planetary gear train 31, the 2nd-speed hydraulic clutch 36 and the intermediate shaft 35 in the mechanical transmission unit 24, and then to the second differential planetary gear train 61 in the differential unit 27. During the transmission, the revolution speed is reduced. The torque of the transmission motor 54 in the hydrostatic transmission unit 25 is also transmitted to the motor output shaft 55 of the transmission motor 54, the gear train 56, the input gear 62, the planet carrier 60d of the first differential planetary gear train 60 and then to the second differential planetary gear train 61 in the differential unit 27, while the revolution speed being reduced. The second differential planetary gear train 61 couples the mechanical transmission unit 24 and the hydrostatic transmission unit 25, whereby their revolution speeds are combined to drive the transmission output shaft 26.

Thus, the transmission motor speed ratio is decreased, thereby increasing the revolution speed of the transmission output shaft 26 in the positive direction.

When the transmission motor speed ratio is plus in 2nd forward speed F2, part of torque from the second differential planetary gear train 61 in the differential unit 27 flows backwardly to the input gear 62 through the planet gear 61c, the sun gear 61a of the second differential planetary gear train 61 and the first differential planetary gear train 60 so that the transmission motor 54 performs its pumping operation. The pumping operation of the transmission motor 54 causes the transmission pump 50 to be driven, and the torque of the transmission pump 50 is transmitted through the pump input shaft 51 and the gear train 52 to the transmission input shaft 23 where the torque is combined with the torque of the engine 21.

When the transmission motor speed ratio is minus on the other hand, part of the torque of the transmission input shaft 23 drives the transmission pump 50 through the gear train 52 and the pump input shaft 51. The drive of the transmission pump 50 actuates the transmission motor 54 whose torque is transmitted to the motor output shaft 55, the gear train 56, the input gear 62 etc. in the differential unit 27, and then to the second differential planetary gear train 61 in the differential unit 27. At the second differential planetary gear train 61, the transmitted torque is combined with torque from the mechanical transmission unit 24 to rotate the transmission output shaft 26.

In 2nd forward speed F2, when the transmission revolution speed ratio is increased to a specified value c, the relative revolution speed of the 3rd-speed hydraulic clutch 40 in relation to the planet carrier 38d of the first 3rd-speed planetary gear train 38 becomes zero. In this condition, if the 3rd-speed hydraulic clutch 40 is engaged and the 2nd-speed hydraulic clutch 36 is disengaged, 3rd forward speed F3 will be established.

In 2nd forward speed F2, when the transmission revolution speed ratio decreases from a higher value to the specified value a, the relative revolution speed of the 1st-speed hydraulic clutch 42 in relation to the clutch board 41 becomes zero. In this condition, if the 1st-speed hydraulic clutch 42 is engaged and the forward hydraulic clutch 33 is disengaged, 1st forward speed F1 will be established.

(iii) 3rd forward speed F3

Since the planet carrier 38d of the first 3rd-speed planetary gear train 38 is hydraulically braked by the engagement of the 3rd-speed hydraulic clutch 40 and the ring gear 31b of the forward planetary gear train 31 is hydraulically braked by the engagement of the forward hydraulic clutch 33, the torque of the transmission input shaft 23 is transmitted through the forward planetary gear train 31, the nd-speed hydraulic clutch 36, the first 3rd-speed planetary gear train 38 and the second 3rd-speed planetary gear train 39 in the mechanical transmission unit 24 to the first and second differential planetary gear trains 60 and 61 in the differential unit 27, while the revolution speed being reduced. The torque of the transmission motor 54 in the hydrostatic transmission unit 25 also is transmitted through the motor output shaft 55 of the transmission motor 54 and the gear train 56 to the first and second differential planetary gear trains 60 and 61 in the differential unit 27, while the revolution speed being reduced. The first and second differential planetary gear trains 60 and 61 couple the mechanical transmission unit 24 and the hydrostatic transmission unit 25, whereby their revolution speeds are combined to drive the transmission output shaft 26.

As the transmission motor speed ratio is thus increased, the revolution speed of the transmission output shaft 26 increases in the positive direction.

When the transmission motor speed ratio is minus in 3rd forward speed F3, part of torque from the first and second differential planetary gear trains 60 and 61 in the differential unit 27 flows backwardly to the input gear 62 so that the transmission motor 54 performs its pumping operation and the torque of the transmission motor 54 is transmitted, as described above, through the transmission pump 50 and the gear train 52 etc. to the transmission input shaft 23 where the torque is combined with the torque of the engine 21.

When the transmission motor speed ratio is plus on the other hand, part of the torque of the transmission input shaft 23 drives the transmission pump 50 through the gear train 52 and the pump input shaft 51 and the torque of the transmission motor 54 is transmitted, as described above, through the gear train 56 and the input gear 62 etc. in the differential unit 27 to the first and second differential planetary gear trains 60 and 61 in the differential unit 27. At the first and second differential planetary gear trains 60 and 61, the torque is combined with torque from the mechanical transmission unit 24 to drive the transmission output shaft 26.

In 3rd forward speed F3, when the transmission revolution speed ratio decreases from a higher value to the specified value c, the relative revolution speed of the 2nd-speed hydraulic clutch 36 in relation to the clutch board 37 becomes zero. In this condition, if the 2nd-speed hydraulic clutch 36 is engaged and the 3rd-speed hydraulic clutch 40 is disengaged, 2nd forward speed F2 will be established.

(iv) 2nd reverse speed R2

Since the clutch board 37 is hydraulically coupled by the engagement of the 2nd-speed hydraulic clutch 36 and the planet carrier 30d of the reverse planetary gear train 30 is hydraulically braked by the engagement of the reverse hydraulic clutch 32, the torque of the transmission input shaft 23 is transmitted through the reverse planetary gear train 30, the 2nd-speed hydraulic clutch 36 and the intermediate shaft 35 in the mechanical transmission unit 24 to the second differential planetary gear train 61 in the differential unit 27, while the revolution speed being reduced. The torque of the transmission motor 54 in the hydrostatic transmission unit 25 is transmitted, as described above, through the motor output shaft 55 of the transmission motor 54, the gear train 56, the input gear 62 and the planet carrier 60d of the first differential planetary gear train 60 in the differential unit 27 to the second differential planetary gear train 61, while the revolution speed being reduced. The second differential planetary gear train 61 couples the mechanical transmission unit 24 and the hydrostatic transmission unit 25 thereby combining their revolution speeds to drive the transmission output shaft 26.

As the motor speed ratio is increased accordingly, the revolution speed of the transmission output shaft 26 increases in the negative direction.

In 2nd reverse speed R2, the operation as that described in the case of 2nd forward speed F2 is carried out with the exceptions that when the transmission motor speed ratio is minus, part of torque from the second differential planetary gear train 61 in the differential unit 27 flows backwardly to the hydrostatic transmission unit 25 so that the transmission motor 54 performs its pumping operation, and when the transmission motor speed ratio is plus, that the part of torque from the transmission input shaft 23 flows toward the hydrostatic transmission unit 25.

In 2nd reverse speed R2, when the transmission revolution speed ratio decreases from a higher value to a specified value d, the relative revolution speed of the 3rd-speed hydraulic clutch 40 in relation to the planet carrier 38d of the first 3rd-speed planetary gear train 38 becomes zero. In this condition, if the 3rd-speed hydraulic clutch 40 is engaged and the 2nd-speed hydraulic clutch 36 is disengaged, 3rd reverse speed R3 will be established.

When the transmission revolution speed ratio is increased to the specified value b in 2nd reverse speed R2, the relative revolution speed of the 1st-speed hydraulic clutch 42 in relation to the clutch board 41 becomes zero. In this condition, if the 1st-speed hydraulic clutch 42 is engaged and the reverse hydraulic clutch 32 is disengaged, 1st reverse speed R1 will be established.

(v) 3rd reverse speed R3

Since the planet carrier 38d of the first 3rd-speed planetary gear train 38 is hydraulically braked by the engagement of the 3rd-speed hydraulic clutch 40 and the planet carrier 30d of the reverse planetary gear train 30 is hydraulically braked by the engagement of the reverse hydraulic clutch 32, the torque of the transmission input shaft 23 is transmitted through the reverse planetary gear train 30, the 2nd-speed hydraulic clutch 36, the first 3rd-speed planetary gear train 38 and the second 3rd-speed planetary gear train 39 in the mechanical transmission unit 24 to the first and second differential planetary gear trains 60 and 61 in the differential unit 27, while the revolution speed being reduced. Also, the torque of the transmission motor 54 in the hydrostatic transmission unit 25 is transmitted, as described above, through the motor output shaft 55 of the transmission motor 54 and the gear train 56 to the first and second differential planetary gear trains 60 and 61 in the differential unit 27, while the revolution speed being reduced. The first and second differential planetary gear trains 60 and 61 couple the mechanical transmission unit 24 and the hydrostatic transmission unit 25 thereby combining their revolution speeds to drive the transmission output shaft 26.

As the transmission motor speed ratio is decreased accordingly, the revolution speed of the transmission output shaft 26 increases in the negative direction.

In 3rd reverse speed R3, the same operation is the same as that described in the case of 3rd forward speed F3 with the exceptions that when the transmission motor speed ratio is plus, part of torque from the first and second differential planetary gear trains 60 and 61 in the differential unit 27 flows backwardly to the hydrostatic transmission unit 25 so that the transmission motor 54 performs its pumping operation, and when the transmission motor speed ratio is minus, that part of torque from the transmission input shaft 23 flows toward the hydrostatic transmission unit 25.

In 3rd reverse speed R3, when the transmission revolution speed ratio is increased to the specified value d, the relative revolution speed of the 2nd-speed hydraulic clutch 36 in relation to the clutch board 37 becomes zero. In this condition, if the 2nd-speed hydraulic clutch 36 is engaged and the 3rd-speed hydraulic clutch 40 is disengaged, 2nd reverse speed R2 will be established.

As has been described above, when 1st forward speed F1, 2nd forward speed F2 or 3rd forward speed F3 is selected, the forward rotary driving force transmitted from the engine 21 to the transmission output shaft 26 rotates the main steering shaft 70 forwardly through the bevel gear mechanism 71 at a revolution speed corresponding to the selected speed. The reverse rotary driving force when 1st reverse speed R1, 2nd reverse speed R2 or 3rd reverse speed R3 is selected rotates the main steering shaft 70 reversely through the bevel gear mechanism 71 at a revolution speed corresponding to the selected speed. The forward or reverse rotation of the main steering shaft 70 at a revolution speed corresponding to the selected speed is transmitted through the first and second differential planetary gear trains 72, 73 to the right and left steering output shafts 78, 79, such that the right and left steering output shafts 78, 79 are rotated forwardly or reversely at the same revolution speed, i.e., such that the right and left crawler belts 5 are driven by the right and left sprockets 6 corresponding to the right and left steering output shafts 78, 79 to travel forwardly or backwardly at the same speed, whereby the vehicle body 2 moves in a forward straight direction or in a backward straight direction.

The rotation of the steering motor 80, of which revolution speed and rotating direction are controlled by the flow/flowing direction control valve 85, rotates the right and left steering output shafts 78, 79 through the intermediate gear 83 and the first differential planetary gear train 72, or through the sub steering shaft 84 and the second differential planetary gear train 73. The rotations of the right and left steering output shafts 78, 79 are transmitted to the crawler belts 5 through the respective sprockets 6. Specifically, when the steering motor 80 rotates forwardly, the left steering output shaft 78 is forwardly rotated and the right steering output shaft 79 is reversely rotated, thereby turning the vehicle body 2 to the right, and when the steering motor 80 rotates reversely, the left steering output shaft 78 is reversely rotated and the right steering output shaft 79 is forwardly rotated, thereby turning the vehicle body 2 to the left.

Rotations, which indicate a rotating direction and revolution speed, are accordingly transmitted from the transmission output shaft 26 and the steering motor 80 to the steering output shafts 78, 79, so that the shafts 78, 79 are forwardly or reversely rotated. The forward and/or reverse rotations of the steering output shafts 78, 79 and the difference between their revolution speeds are utilized for steering the vehicle body 2. Note that when rotation, which specifies a rotating direction and revolution speed, is transmitted to the right and left steering output shafts 78, 79 from only the transmission output shaft 26, the vehicle body 2 travels in a forward straight direction or backward straight direction at a driving speed (vehicle speed) which corresponds to the revolution speed. On the other hand, when rotation, which specifies a rotating direction and revolution speed, is transmitted from only the steering motor 80, the spin turn of the vehicle body 2 in a rightward or leftward direction takes place at a turning speed which corresponds to the above revolution speed.

The control operation for the mechanical transmission unit 24, the hydrostatic transmission unit 25 and the steering unit 28 will be explained hereinbelow.

In FIG. 2, the engine output shaft 22 of the engine 21 is provided with an engine revolution speed detector 91 for detecting the revolution speed of the engine output shaft 22 to detect the revolution speed $n_E$ of the engine 21, and the motor output shaft 55 of the transmission motor 54 in the hydrostatic transmission unit 25 is provided with a motor revolution speed detector 92 for detecting the revolution speed $n_m$ of the transmission motor 54 as well as its rotating direction. An engine throttle (not shown) is provided with a throttle position detector 93 for detecting the position X of the engine throttle which is actuated by operating the engine throttle lever 13 in forward and backward directions. The steering lever 14 is provided with a steering lever displacement detector 94 for detecting the displacement θ of the steering lever 14 which is operated in rightward and leftward directions. The forward/reverse drive switch lever 15 is provided with a forward/reverse drive switch lever position detector 95 for detecting the position FNR of the forward/reverse drive switch lever 15 operated in forward and backward directions, i.e., whether the switch lever 15 is placed in the forward position F (for driving the vehicle body 2 forwards), the neutral position N or the reverse position R (for driving the vehicle body 2 backwards). An engine revolution speed signal from the engine revolution speed detector 91, a motor revolution speed signal from the motor revolution speed detector 92, a throttle position signal from the throttle position detector 93, a steering ever displacement signal from the steering lever displacement detector 94 and a forward/reverse drive switch lever position signal from the forward/reverse drive switch lever position detector 95 are all supplied to a control unit 96.

The control unit 96 is composed of a central processing unit (CPU) 96A for executing a specified program; a read only memory (ROM) 96B for storing the above program and various tables; and a random access memory (RAM) 96C serving as a working memory necessary for executing the above program. According to the engine revolution speed signal, the motor revolution speed signal, the throttle position signal, the steering lever displacement signal and the forward/reverse drive switch lever position signal, the above program is executed, thereby performing arithmetic operation. Then, the control unit 96 supplies a switching control signal to the speed range switch control valve 43 for performing, as described above, the shift control of the reverse hydraulic clutch 32, the forward hydraulic clutch 33, the 2nd-speed hydraulic clutch 36, the 3rd-speed hydraulic clutch 40 and the 1st-speed hydraulic clutch 42. The control unit 96 supplies a swash plate angle control signal to the angular displacement control valve 57 for performing the angular displacement control of the discharge setting variable-angle swash plate 50a of the transmission pump 50 and to the angular displacement control valve 58 for performing the angular displacement control of the discharge setting variable-angle swash plate 54a of the transmission motor 54.

Figure 4:
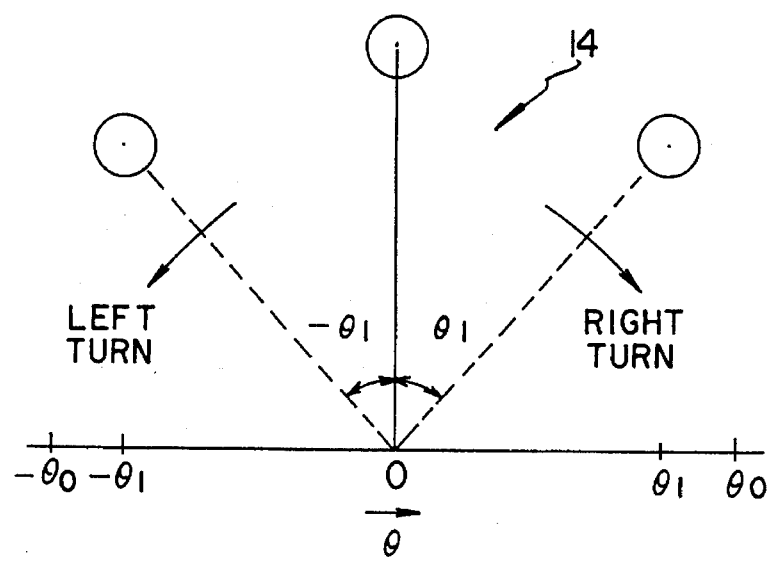

The control unit 96 also supplies a flow/flowing direction control signal to the flow/flowing direction control valve 85 for controlling the flow and flowing direction of pressure oil supplied to the steering motor 80. Note that the vehicle body 2 turns to the right or left in correspondence with the operating direction (right or left) of the steering lever 14, and $-\theta_0$ and $\theta_0$ shown in FIG. 4 designate the maximum stroke displacement values of the steering lever 14 when it is moved to the right and left. The maximum steering motor revolution speed displacement values at which the steering motor 80 reaches its maximum revolution speed are designated by $-\theta_1$, $\theta_1$ which are about 90% of the maximum stroke displacement values $-\theta_0$, $\theta_0$. As the steering lever 14 is moved from the neutral position (i.e., the steering lever displacement value =0) rightwardly to the position corresponding to the displacement value $\theta_1$ or leftwardly to the position corresponding to the displacement value $-\theta_1$, the revolution speed of the steering motor 80 increases during its forward or reverse rotation. More specifically, the rotating direction (forward or reverse) of the steering motor 80 is determined by the displacement direction of the steering lever 14 displaced from the neutral position and the revolution speed of the steering motor 80 is increased during its forward or reverse rotation according to the displacement distance of the steering lever 14 from the neutral position.

Figure 5A:
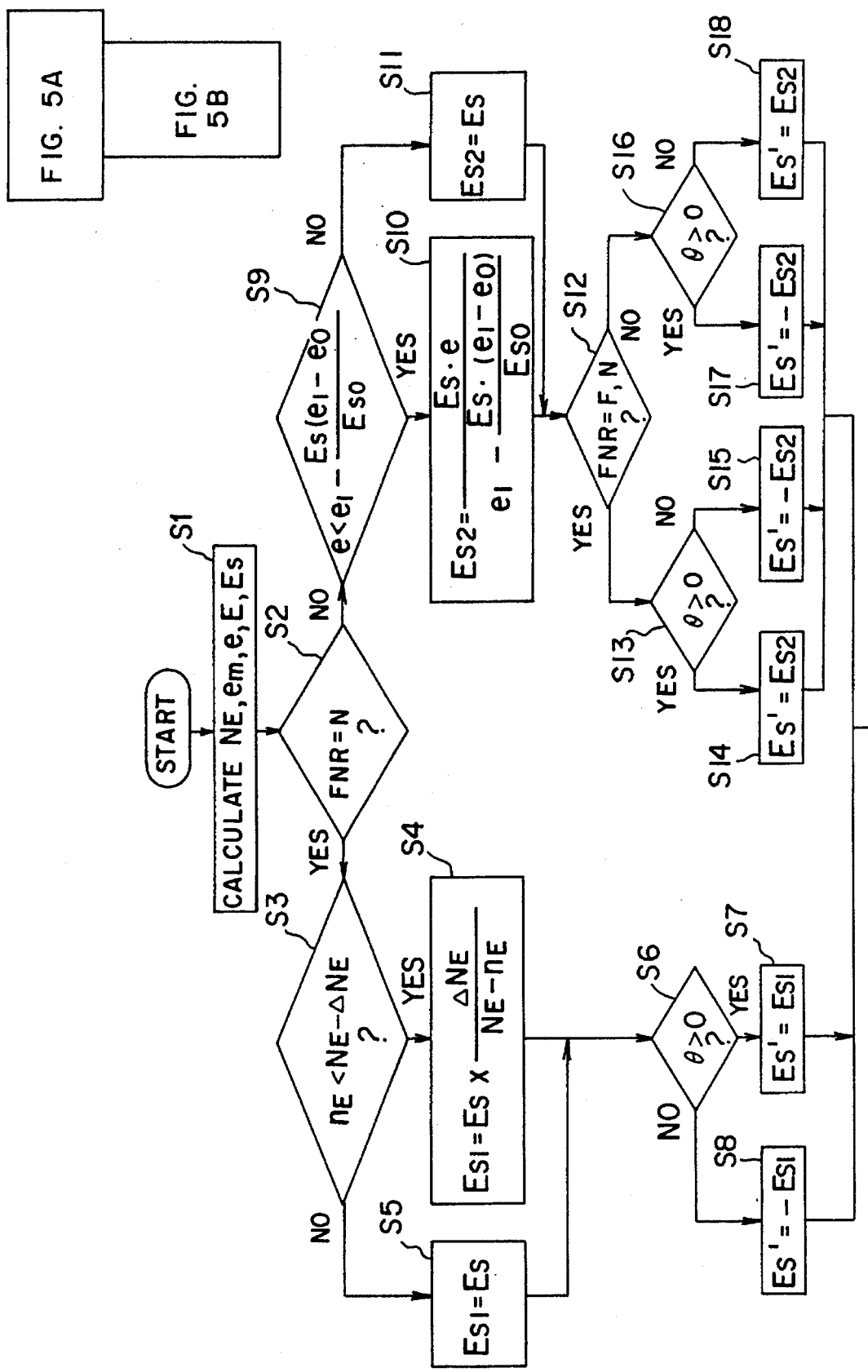
Figure 5B:
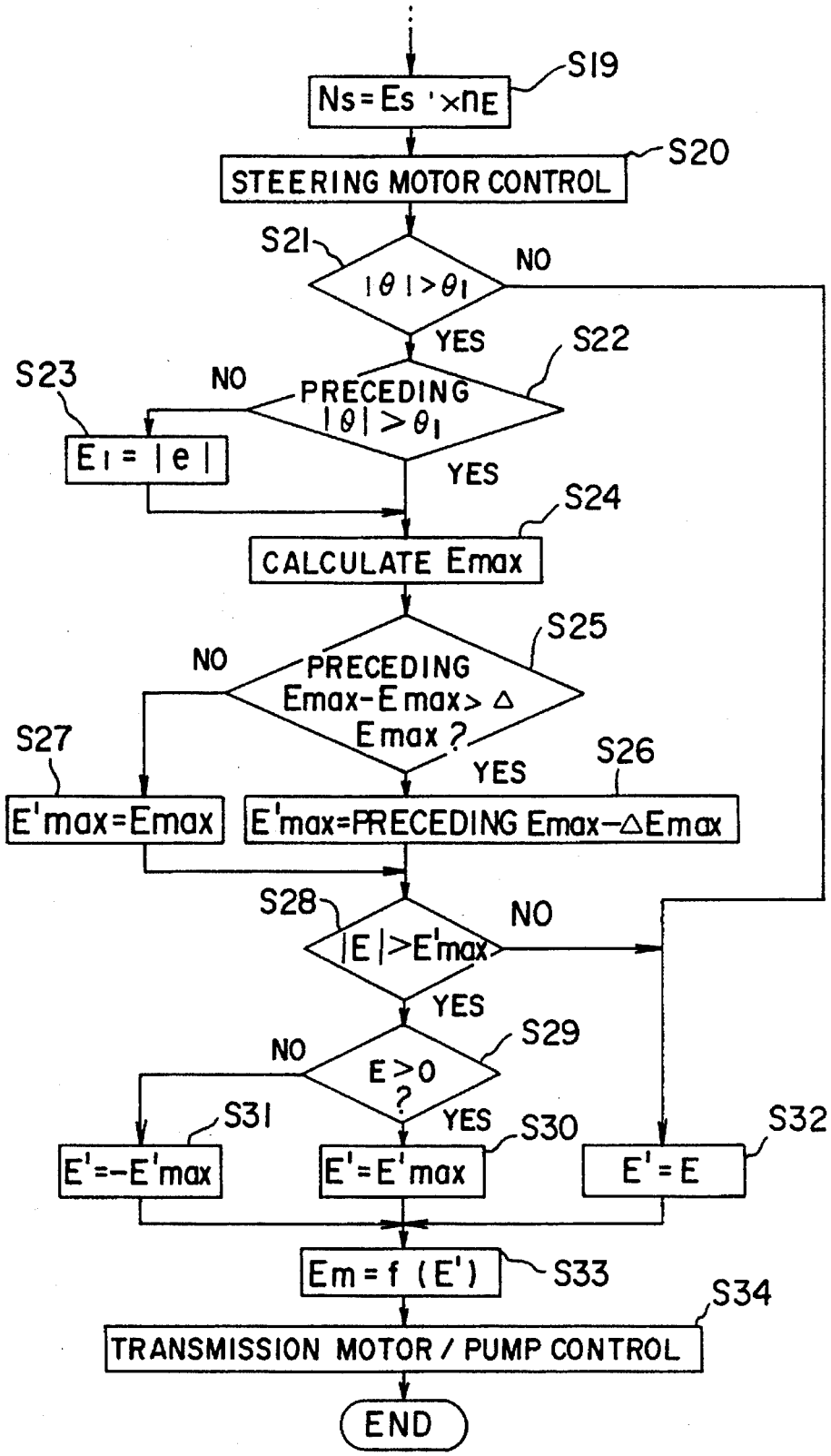

Finally, reference is made to the flow chart of FIG. 5, for describing the angular displacement control of the discharge setting variable-angle swash plate 50a of the transmission pump 50 and the discharge setting variable-angle swash plate 54a of the transmission motor 54, and the flow and flowing direction control of pressure oil supplied to the steering motor 80, these controls being performed based on the arithmetic operation by the aforesaid program in the control unit 96.

Figure 6:
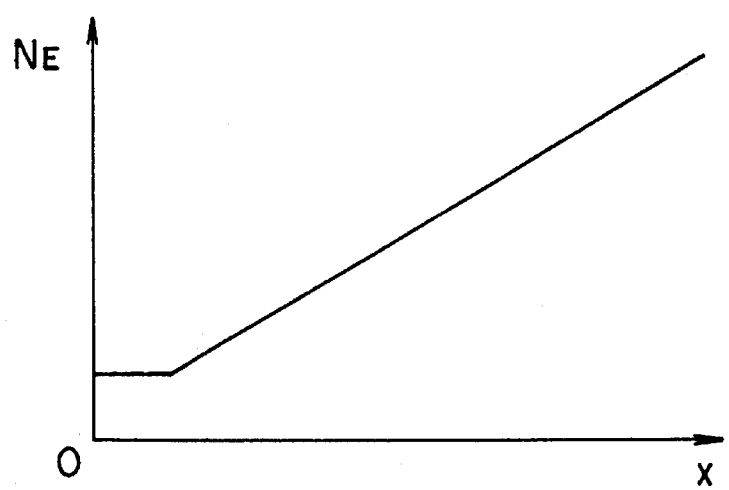
Figure 7:
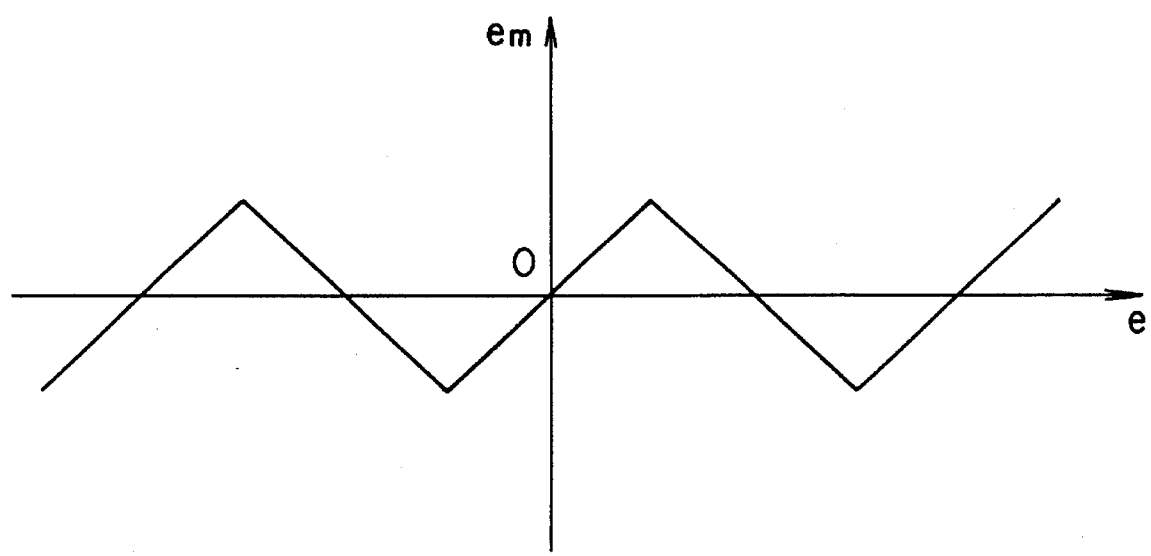

Step 1: In accordance with a throttle position signal from the throttle position detector 93, the target engine revolution speed $N_E$ of the engine 21 for the throttle position X is firstly obtained by calculation, that includes conversion, using a preliminarily set and stored characteristic functional equation or table. The characteristic functional equation or table is set based on the characteristic curve of the target engine revolution speed $N_E$ plotted against the throttle position X in FIG. 6, the characteristic curve having been prepared from the characteristic curve of torque plotted against the engine revolution speed of the engine 21. Next, actual transmission motor speed ratio $e_m$ ($=n_m/n_E$), which is the ratio of the present actual revolution speed $n_m$ of the transmission motor 54 to the present actual revolution speed $n_E$ of the engine 21, is calculated from the present actual engine revolution speed $n_E$ which has been obtained from an engine revolution speed signal from the engine revolution speed detector 91 and from the present actual motor revolution speed $n_m$ which has been detected by the motor revolution speed detector 92. Then, in order to obtain the present actual transmission revolution speed ratio e, the actual transmission motor speed ratio $e_m$ thus obtained is converted using the preset and stored characteristic functional equation $e= f(e_m)$ or table in accordance with the present controlled state (speed range) of the mechanical transmission unit 24 which is controlled through the speed range switch control valve 43 based on the present actual engine revolution speed $n_E$ and based on the lever position FNR instructed by a forward/reverse drive switch lever position signal from the forward/reverse drive switch lever position detector 95. This characteristic functional equation $e= f(e_m)$ or table is represented by a characteristic curve similar to that of FIG. 3, and is set in accordance with the characteristic curve of the actual transmission motor speed ratio $e_m$ plotted against the actual transmission revolution speed ratio $e$ in FIG. 7.

Target transmission revolution speed ratio E is obtained using the following equation, from the target engine revolution speed $N_E$, the actual transmission revolution speed ratio $e$ and the actual engine revolution speed $n_E$ which have been obtained in the above process. Note that k is a coefficient (unit=1/rpm).

$$E=e+k(n_E-N_E) \qquad (1)$$

Figure 8:
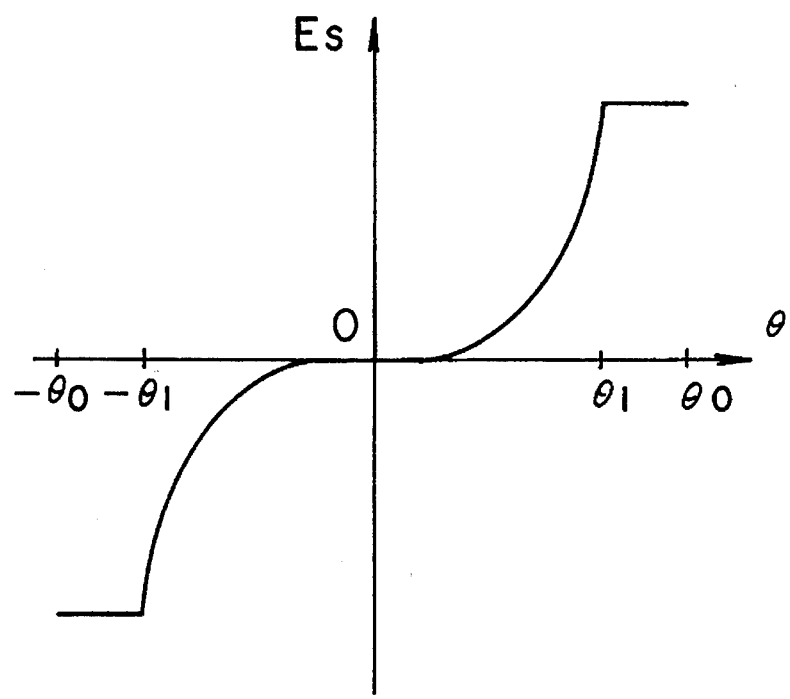

Then, in accordance with a steering lever displacement signal from the steering lever displacement detector 94, the target steering motor speed ratio $E_S$ (= a target revolution speed for the motor output shaft 81 of the steering motor 80 [target steering motor revolution speed $N_s$]/the target engine revolution speed $N_E$ or the actual engine revolution speed $n_E$) of the steering motor 80 for the steering lever displacement $\theta$ is obtained by calculation, which includes conversion, using a preliminarily set and stored characteristic functional equation or table. The characteristic functional equation or table is set based on the characteristic curve of the target steering motor speed ratio $E_S$ plotted against the steering lever displacement $\theta$ in FIG. 8. Then, the absolute value of the thus calculated target steering motor speed ratio $E_S$ is obtained.

Step 2: It is judged from a forward/reverse drive switch lever position signal sent from the forward/reverse drive switch lever position detector 95 whether or not the forward/reverse drive switch lever 15 is in the neutral position N where a spin turn (i.e., the right and left crawler belts 5 travel in different directions at the same speed) is carried out. If the forward/reverse drive switch lever 15 is not placed in the neutral position N but placed in either the forward position F or the reverse position R, the program proceeds to Step 9.

Step 3 to Step 5: If it is determined in Step 2 that the forward/reverse drive switch lever 15 is placed in the neutral position N where a spin turn is carried out, it is then judged whether the present actual engine revolution speed $n_E$ detected from an engine revolution speed signal from the engine revolution speed detector 91 satisfies the following equation:

$$n_E < N_E - \Delta N_E$$

where $N_E$ is the target engine revolution speed and $\Delta N_E$ is a preset deviation.

Then, in accordance with the judgment, a target steering motor speed ratio $E_{S1}$ at the time of a spin turn is obtained using the following equations, from the target steering motor speed ratio $E_s$ which corresponds to the steering lever displacement $\theta$.

(i) If $n_E < N_E - \Delta N_E$ is satisfied, $$E_{S1}=E_S \times \Delta N_E/(N_E-n_E) \qquad (2)$$

(ii) If $n_E < N_E - \Delta N_E$ is not satisfied, $$E_{S1}=E_S$$

In cases where the actual engine revolution speed $n_E$ of the engine 21 excessively decreases below the target engine revolution speed $N_E$ because of the load at the time of a spin turn, with a decrease in the efficiency of the engine 21, the target steering motor speed ratio for the steering motor 80 and therefore the target steering motor revolution speed is decreased to reduce the load torque of the engine 21, whereby the drop in the engine revolution speed can be prevented to keep the optimum engine efficiency and the occurrence of stall can be prevented.

Step 6 to Step 8: In order to determine the rotating direction of the steering motor 80 such that the operating direction of the steering lever 14 which is operated in rightward and leftward directions is coincident with the turning direction (right or left) of the vehicle body 2, a target steering motor speed ratio $E_S'$, which specifies the turning direction of the vehicle body 2, is obtained from the following equations.

(i) Where the steering lever 14 is placed in the neutral position N or moved to the left and therefore the steering lever displacement $\theta$ obtained from a steering lever displacement signal is zero or minus:

$$E_S'=-E_{S1}(\text{reverse rotation})$$

(ii) Where the steering lever 14 is moved to the right and therefore the steering lever displacement $\theta$ obtained from a steering lever displacement signal is plus:

$$E_S'=E_{S1}(\text{forward rotation})$$

Step 9 to Step 11: If it is determined in Step 2 that the forward/reverse drive switch lever 15 is not placed in the neutral position N where a spin turn takes place but placed in the forward position F or reverse position R, it is then judged whether the actual transmission revolution speed ratio $e$ satisfies the following equation:

$$e<e_1-E_S \times (e_1-e_0)/E_{S0}$$

where $e_0$ is a maximum transmission revolution speed ratio with which either of the right and left crawler belts 5 is stopped and the pivot turn of the vehicle body 2 can take place;

$e_1$ is a maximum transmission speed ratio with which the vehicle body 2 can turn with a constant turning radius; and $E_{S0}$ is a parameter for making the steering motor speed ratio proportional to the transmission revolution speed ratio $e$ when the steering motor speed ratio $E_S$ corresponding to the steering lever displacement $\theta$ is the maximum steering motor speed ratio, such that the pivot turn of the vehicle body 2 is carried out until the absolute value of the transmission revolution speed ratio $e$ becomes equal to the maximum transmission revolution speed ratio $e_0$ with which the pivot turn is possible.

Then, according to the above judgment, a target steering motor speed ratio $E_{S2}$ which instructs a turn with a constant turning radius is obtained from the following equations.

(i) If $e<e_1-E_S \times (e_1-e_0) / E_{S0}$ is satisfied:

$$E_{S2}=E_S \times e/(e_1-E_S \times (e_1-e_0)/E_{S0})$$

(ii) If $e<e_1-E_S \times (e_1-e_0) / E_{S0}$ is not satisfied:

$$E_{S2}=E_S$$

Figure 9:
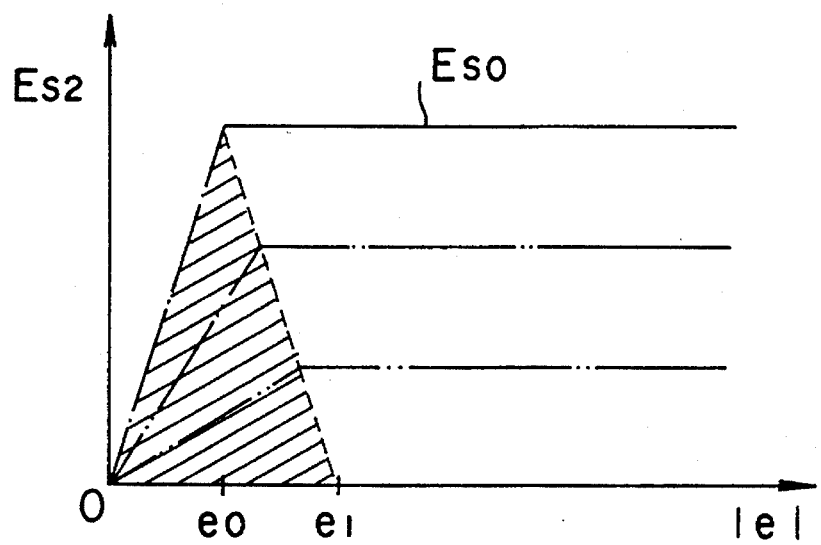

The above parameter $E_{S0}$ is as shown in FIG. 9. In FIG. 9, the hatched part represents the region where a turn with a constant turning radius takes place and the part defined by chain line represents the region where a pivot turn takes place.

In the low vehicle speed region, if the steering lever displacement θ is maintained constant, a turn with a constant turning radius as well as a pivot turn takes place irrespective of the vehicle speed and in this case, when the turning radius is minimum, a pivot turn takes place. With this arrangement, the maximum range ($-θ^1 \leqslant θ_1$) of the steering lever 14 operated in rightward and leftward directions can be utilized, which leads to a high accuracy in the operation and facilitates the steering control of the vehicle body 2.

Step 12 to Step 18: The forward/reverse drive switch lever 15 has been shifted and it is detected from a forward/reverse drive switch lever position signal that the forward/reverse drive switch lever 15 is placed either in the forward position F where the forward drive of the vehicle body 2 takes place or the reverse position R where the reverse drive of the vehicle body 2 takes place. In this condition, if the steering lever displacement θ obtained from a steering lever displacement signal is minus, that is, the steering lever 14 is moved to the left, thereby to turn the vehicle body 2 leftwards, or if the steering lever displacement θ is plus, that is, the steering lever 14 is moved to the right, thereby to turn the vehicle body 2 rightwards, the target steering motor speed ratio $E_S{}'$ which specifies the turning direction of the vehicle body 2 is obtained from the following equations. With the target steering motor speed ratio $E_S{}'$ thus obtained, the rotating direction of the steering motor 80 is determined such that the operating direction of the steering lever 14 is coincident with the turning direction of the vehicle body 2 throughout the forward drive and reverse drive of the vehicle body 2, thereby giving the operator a consistent feeling.

(i) Where the switch lever 15 is in the forward position F or the neutral position N and the steering lever displacement θ is plus:

$$E_S{}'=E_{S2}\text{(forward rotation)}$$

(ii) Where the switch lever 15 is in the forward position F or the neutral position N and the steering lever displacement θ is minus:

$$E_S{}'=-E_{S2}\text{(reverse rotation)}$$

(iii) Where the switch lever 15 is in the reverse position R and the steering lever displacement θ is plus:

$$E_S{}'=-E_{S2}\text{(reverse rotation)}$$

(iv) Where the switch lever 15 is in the reverse position R and the steering lever displacement θ is minus:

$$E_S{}'=E_{S2}\text{(forward rotation)}$$

Step 19: According to the target steering motor speed ratio $E_S{}'$ which specifies the turning direction of the vehicle body 2, the target steering motor revolution speed $N_S$ which specifies the rotating direction of the steering motor 80 is obtained using the following equation, from the actual engine revolution speed $n_E$.

$$N_S = E_S{}' \times n_E$$

The target steering motor revolution speed $N_S$ for the actual engine revolution speed $n_E$ is thus obtained and the steering motor revolution speed is allowed to be varied with a desired engine revolution speed within the maximum range ($-θ_1 \leqslant θ_1$) of the laterally operated steering lever 14 until it reaches the maximum steering motor revolution speed. With such an arrangement, a high accuracy can be ensured in turning the vehicle body 2.

Figure 10:
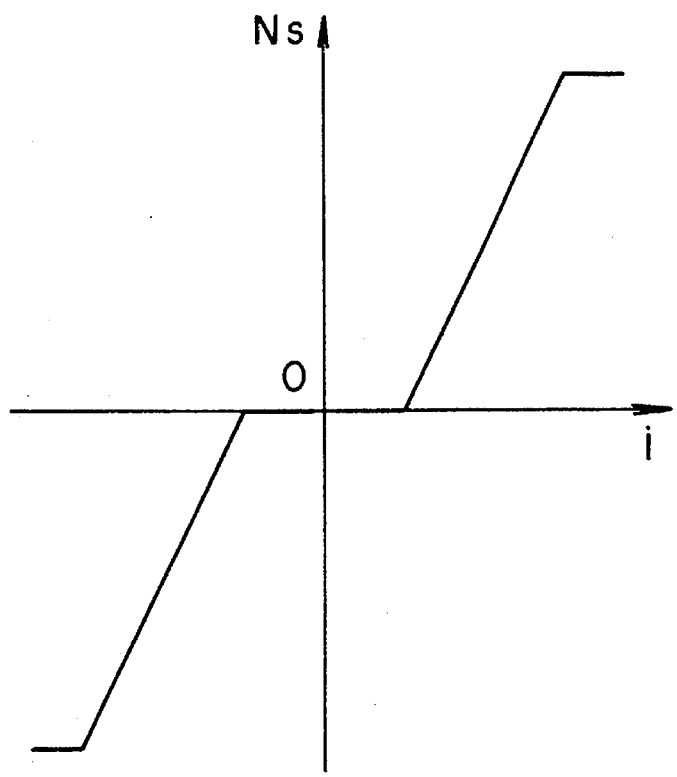

Step 20: From the target steering motor revolution speed $N_S$ which specifies a rotating direction, a solenoid control current i for the above target steering motor revolution speed $N_S$ is obtained by performing arithmetic operation, that includes conversion, with a preset and stored characteristic functional equation or table. The solenoid control current i is to be supplied to the flow/flowing direction control valve 85 (= EPC valve) in order to rotate the steering motor 80 at the specified speed in the specified rotating direction. The characteristic functional equation or table is preset based on the characteristic curve of the target steering motor revolution speed $N_S$ which specifies the rotating direction plotted against the solenoid control current i in FIG. 10. The solenoid control current i is output as a flow/flowing direction control signal to the flow/flowing direction control valve 85.

The actual revolution speed of the steering motor 80 is accordingly adjusted to be the target steering motor revolution speed $N_S$.

Step 21: It is judged from a steering lever displacement signal sent from the steering lever displacement detector 94 whether or not the absolute value of the steering lever displacement θ exceeds the maximum steering motor revolution speed displacement value $θ_1$ which is about 90% of the maximum stroke displacement value $θ_0$. If it does not exceed, the program proceeds to Step 32.

Step 22 and Step 23: If it is determined in Step 21 that the absolute value of the steering lever displacement θ exceeds the maximum steering motor revolution speed displacement value $θ_1$, it is then judged whether the absolute value of the steering lever displacement θ of the preceding control cycle has exceeded the maximum steering motor revolution speed displacement value $θ_1$. If the displacement θ of the preceding control cycle has not exceeded and the displacement θ of the present control cycle exceeds, the absolute value of the actual transmission revolution speed ratio e is set as a transmission revolution speed ratio $E_1$ for the maximum steering motor revolution speed displacement value $θ_1$.

Figure 11:
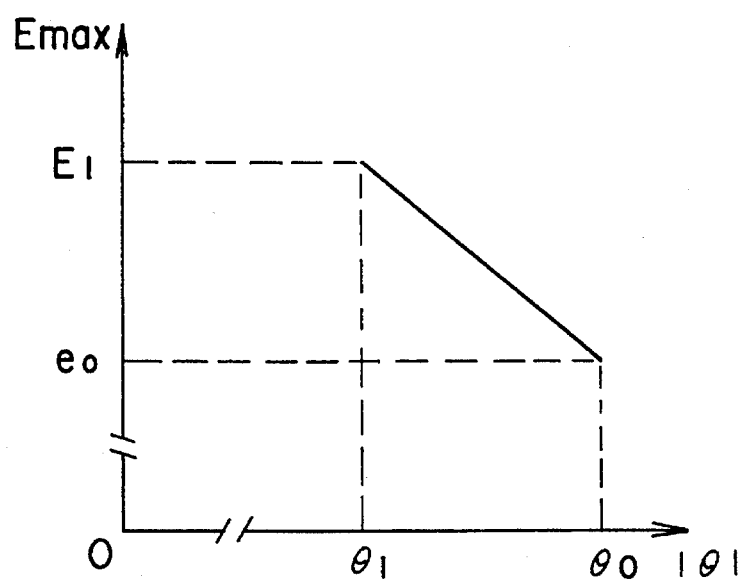

Step 24: According to the transmission revolution speed ratio $E_1$ for the maximum steering motor revolution speed displacement value $θ_1$ which has been set and according to the maximum transmission revolution speed ratio $e_0$ with which a pivot turn can be carried out with the maximum stroke displacement value $θ_0$, a maximum target transmission revolution speed ratio $E_{max}$ is obtained from the proportional calculation shown in FIG. 11, using the absolute value of the steering lever displacement θ.

Step 25 to Step 32: It is firstly judged whether the maximum target transmission revolution speed ratio $E_{max}$ satisfies the following equation.

$$\text{Preceding } E_{max} - E_{max} > \Delta E_{max}$$

where Preceding $E_{max}$ is the maximum target transmission speed ratio in the preceding control cycle and $\Delta E_{max}$ is a preset deviation.

Then, a maximum target transmission speed ratio $E'_{max}$ which instructs a buffer control is obtained as follows from the above judgment.

(i) If Preceding $E_{max} - E_{max} > \Delta E_{max}$ is satisfied:

$$E'_{max} = \text{Preceding } E_{max} - \Delta E_{max}$$

(ii) If Preceding $E_{max}-E_{max}>\Delta E_{max}$ is not satisfied:

$$E'=E_{max}$$

Thereafter, it is judged whether the absolute value of the target transmission revolution speed ratio E exceeds the maximum target transmission revolution speed ratio $E'_{max}$ which instructs a buffer control. If it exceeds, a target transmission revolution speed ratio E', which indicates whether the steering lever displacement θ is plus or minus, is obtained from the following equations.

(i) If the target transmission revolution speed ratio E is plus, i.e., when the forward drive takes place:

$$E'=E'_{max}$$

(ii) If the target transmission revolution speed ratio E is minus (0), i.e., when the reverse drive takes place:

$$E'=-E'_{max}$$

If the absolute value of the target transmission revolution speed ratio E does not exceed the maximum target transmission revolution speed ratio $E'_{max}$ which instructs a buffer control and if it is determined in Step 21 that the absolute value of the steering lever displacement θ does not exceed the maximum steering motor revolution speed displacement value $θ_1$, the target transmission revolution speed ratio E', which indicates whether the steering lever displacement θ is plus or minus, is obtained from the following equation.

$$E'=E$$

As has been described above, if the steering lever displacement θ of the steering lever 14 exceeds the maximum steering motor revolution speed displacement value $θ_1$ when the running load of the vehicle body 2 is small and the vehicle body 2 travels at high speed, the target transmission revolution speed ratio is made small, thereby reducing the vehicle speed and making the turning radius of the vehicle body 2 small. When the steering lever 14 has been moved to the position corresponding to the maximum stroke displacement value $θ_0$, the target revolution speed ratio $e_0$, with which a pivot turn takes place, is set. This leads to an improvement in the operability. Further, even if the steering lever 14 is abruptly operated, the abrupt reduction of vehicle speed is prevented using the deviation $\Delta E_{max}$ so that vehicle speed can be gradually reduced, thereby avoiding a shock caused by the abrupt speed reduction.

Figure 12:
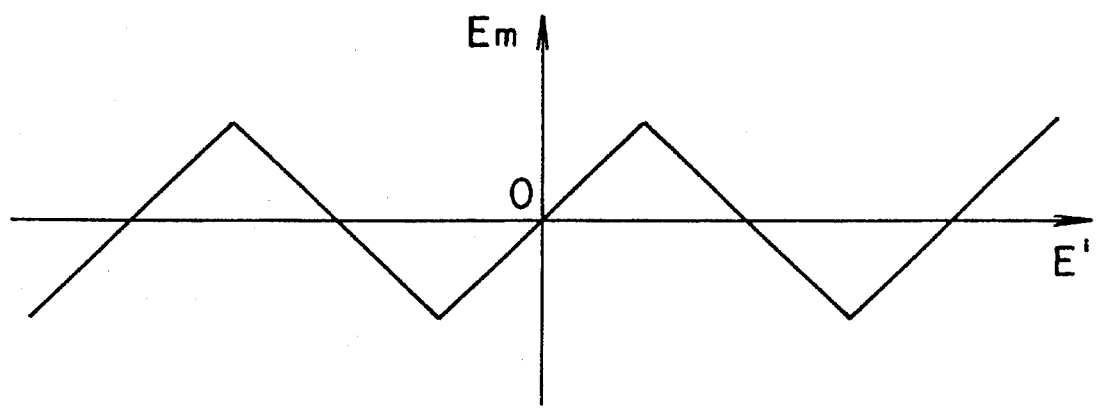

Step 33: According to the present state of the speed range in the mechanical transmission 24, the target transmission revolution speed ratio E', which indicates whether the steering lever displacement θ is plus or minus, is converted using the preset and stored characteristic functional equation $E_m=f(E')$ or table, thereby obtaining a target transmission motor speed ratio $E_m$. The characteristic functional equation $E_m=f(E')$ or table is the same characteristic curve as shown in FIG. 3 and preset in accordance with the characteristic curve of the target transmission motor speed ratio $E_m$ plotted, in FIG. 12, against the target transmission revolution speed ratio E' which indicates whether the steering lever displacement θ is plus or minus.

Step 34: An operating amount A, that is, the sum of a feed forward amount $KE_m$ (K: feed forward coefficient) which is proportional to the target transmission motor speed ratio $E_m$ and the proportional components and integral components of the deviation ($=E_m-e_m$) of an actual transmission motor speed ratio $e_m$ from the target transmission motor speed ratio $E_m$ is obtained from the target transmission motor speed ratio $E_m$ and the actual transmission motor speed ratio $e_m$. Then, the operating amount A is output to the angular displacement control valves 57 and 58 as a swash plate angle control signal.

Accordingly, the actual transmission motor speed ratio $e_m$ is adjusted to be the target transmission motor speed ratio $E_m$ and the actual transmission revolution speed ratio e is adjusted to be the target transmission revolution speed ratio E' which indicates whether the steering lever displacement θ is plus or minus.

In the foregoing embodiment, the steering motor speed ratio $E_s'$ which specifies the turning direction of the vehicle body 2 is obtained according to whether the forward/reverse drive switch lever 15 is in the forward position F or the reverse position R and according to whether the displacement θ of the steering lever 14 is plus or minus, in order to determine the rotating direction of the steering motor 80 such that the operating direction (right or left) of the steering lever 14 is coincident with the turning direction (right or left) of the vehicle body 2 throughout the forward drive and reverse drive of the vehicle, thereby giving the operator a consistent feeling. However, the steering motor speed ratio $E_s'$ may be obtained as follows.

(i) If the actual transmission revolution speed ratio e is plus and the steering lever displacement θ is plus:

$$E_s'=E_{S2}\text{(forward rotation)}$$

(ii) If the actual transmission revolution speed ratio e is plus and the steering lever displacement θ is minus:

$$E_s'=-E_{S2}\text{(reverse rotation)}$$

(iii) If the actual transmission revolution speed ratio e is minus and the steering lever displacement θ is plus:

$$E_s'=-E_{S2}\text{(reverse rotation)}$$

(iv) If the actual transmission revolution speed ratio e is minus and the steering lever displacement θ is minus:

$$E_s'=E_{S2}\text{(forward rotation)}$$

In the foregoing embodiment, when the steering lever displacement θ is maintained constant in the low vehicle speed region, the vehicle speed is obtained from the actual transmission revolution speed ratio e in order to maintain the turning radius constant by making the target steering motor revolution speed $N_S$ of the steering motor 80 proportional to the vehicle speed. However, the vehicle speed may be obtained from the actual speed of the vehicle body 2 detected by a Doppler speed meter arranged in the vehicle body 2.

Figure 13:
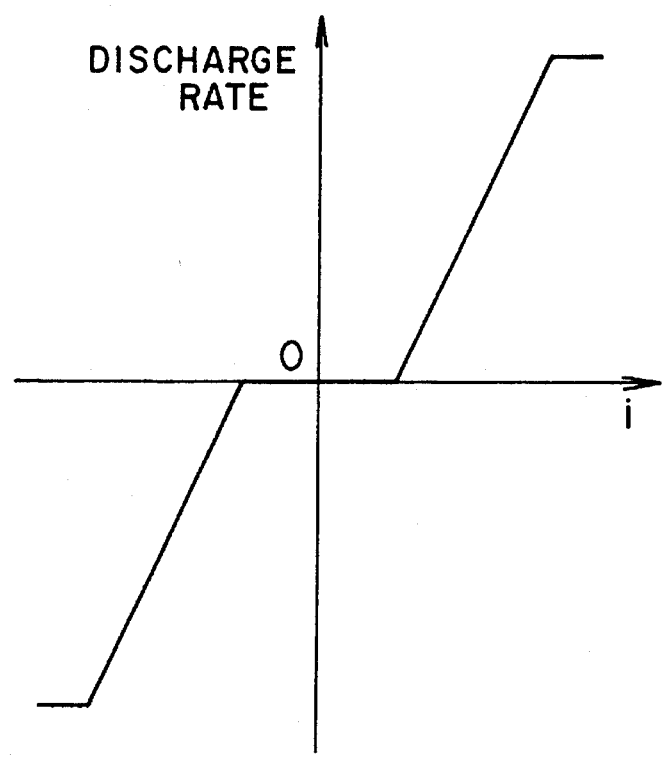
FIG. 13 is a graph which corresponds to FIG. 10 and shows another embodiment of the steering control system for use in a track-laying vehicle of the invention applied to a bulldozer and in which a characteristic curve of a discharge rate is plotted against a solenoid control current i.

In the foregoing embodiment, the steering motor 80 is so controlled that the steering motor revolution speed becomes equal to the target steering motor revolution speed $N_S$ which instructs a turn with a constant turning radius (which specifies the rotating direction of the steering motor 80), by controlling the flow and flowing direction of pressure oil supplied to the steering motor 80 by means of the flow/flowing direction control valve 85. However, the steering motor 80 may be controlled in the following way without the use of the flow/flowing direction control valve 85. The steering motor 80 is directly connected to the steering pump 86 by a pair of conduits. With a characteristic functional equation or table in which the solenoid control current i applied to the angular displacement control valve 90 for performing the angular displacement control of the discharge setting variable-angle swash plate 86a of the steering pump 86 is set according to the characteristic curve shown in FIG. 13, the discharge rate is controlled, thereby adjusting the steering motor speed ratio of the steering motor 80 to be the target steering motor speed ratio $E_S'$ which instructs a turn with a constant turning radius (which specifies the turning direction of the vehicle body 2). In the foregoing embodiment, for obtaining the target steering motor revolution speed $N_S$ which instructs a turn with a constant turning radius (which specifies the rotating direction of the steering motor 80), the target steering motor speed ratio $E_{S2}$ which instructs a turn with a constant turning radius is first obtained from the target motor speed ratio $E_S$, using the parameter $E_{S0}$ and then the target steering motor revolution speed $N_S$ is obtained from the target steering motor speed ratio $E_{S2}$. However, it may be obtained in the following way. A target motor revolution speed is firstly obtained from the target motor speed ratio $E_S$ and then, the target steering motor revolution speed which instructs a turn with a constant turning radius (which specifies the rotating direction of the steering motor 80) is obtained from the target motor revolution speed, using the same parameter.

In the foregoing embodiment, in order to control the tilt angles of the discharge setting variable-angle swash plate 50a of the transmission pump 50 and the discharge setting variable-angle swash plate 54a of the transmission motor 54, the transmission motor speed ratio which corresponds to the discharge ratio of the transmission pump 50 to the transmission motor 54 and which is described by the following equation is utilized.

$$e_m = n_m/n_E = q_p/q_m \times 1/\rho \times \eta_p \times \eta_m,$$

where $q_p$ is the discharge of the variable displacement pump (transmission pump) 50; $q_m$ is the discharge of the variable displacement motor (transmission motor) 54; $\eta_p$ is the volumetric efficiency of the variable displacement pump (transmission pump) 50; $\eta_m$ is the volumetric efficiency of the variable displacement motor (transmission motor) 54; and $\rho$ is the reduction gear ratio between the engine 21 and the variable displacement pump (transmission pump) 50. Thus, since the feed forward amount $KE_m$ which is proportional to the target transmission motor speed ratio $E_m$ is supplied to the angular displacement control valves 57, 58 as a swash plate angle control signal, the response of the swash plate angular control can be speeded up. Further, since the proportional components and integral components of the deviation ($=E_m-e_m$) are also supplied to the angular displacement control valves 57, 58 as swash plate angle control signals, it is possible to perform a control in which convergency to the target engine revolution speed $N_E$ is excellent by proportional control and integral control for the deviation ($=E_M-e_m$). Further, since the target transmission revolution speed ratio E is calculated using Equation (1), the target transmission revolution speed ratio E becomes equal to the actual transmission revolution speed ratio e when the actual engine revolution speed $n_E$ is equal to the target engine revolution speed $N_E$. Therefore, the actual engine revolution speed $n_E$ can be stably adjusted to be the target engine revolution speed $N_E$.

Although. Equation (1) is used for obtaining the target transmission revolution speed ratio E in the foregoing embodiment, the following equation may be used.

$$E = e \times n_E/N_E$$

Further, either of the following equations, where E' denotes the target transmission revolution speed ratio in the preceding control cycle, may be used.

$$E = E' + k(n_E - N_E)$$

or $$E = E' \times n_E/N_E$$

In this case, there is no need to obtain the actual transmission revolution speed ratio e in order to obtain the target transmission revolution speed ratio E.

Although the target steering motor speed ratio $E_{S1}$ at the time of a spin turn is obtained from Equation (2) in the foregoing embodiment, it may be obtained from either of the following equations. Note that k is a coefficient which unit is 1/rpm.

$$E_{S1} = E_S \times n_E/N_E$$

or $$E_{S1} = E_S + k(n_E - N_E)$$

In the foregoing embodiment, although the actual transmission motor speed ratio $e_m$ is obtained directly from the ratio of transmission motor revolution speed to engine revolution speed, it may be obtained from the ratio of transmission output shaft revolution speed to transmission input shaft revolution speed, detecting the revolution speeds of the transmission input shaft 23 and the transmission output shaft 26, taking the reduction gear ratio etc. from the engine 21 into account. Another alternative is that the revolution speed of the transmission input shaft 23 and the revolution speed of the motor output shaft 55 of the transmission motor 54 are detected and the actual transmission motor speed ratio $e_m$ is obtained from the ratio of the transmission motor revolution speed to the transmission input shaft revolution speed. In these cases, it is possible that a target transmission revolution speed for the transmission input shaft 23 when the throttle is in a throttle position x is obtained by detecting the throttle position x from a throttle position signal sent from the throttle position detector 93 and that the actual transmission motor speed ratio $e_m$ is converted into the transmission revolution speed ratio of the revolution speed of the transmission input shaft 23 to the revolution speed of the transmission output shaft 26 and the target transmission motor speed ratio $E_m$ is obtained through the calculation for obtaining the target transmission revolution speed ratio of the revolution speed of the transmission output shaft 26 to the revolution speed of the transmission input shaft 23. Similarly, the actual transmission motor speed ratio may be obtained from the ratio of the transmission output shaft revolution speed to the engine revolution speed or the ratio of the transmission motor speed to the transmission output shaft revolution speed, taking the reduction gear ratio etc. from the engine 21 into account.

In the foregoing embodiment, the angle of the discharge setting variable-angle swash plate 50a of the transmission pump 50 and that of the discharge setting variable-angle swash plate 54a of the transmission motor 54 are controlled through the angular displacement control valves 57 and 58, according to the operating amount A. However, either of the angles of the discharge setting variable-angle swash plates 50a and 54a may be controlled.

While the engine throttle is mechanically, directly actuated by the engine throttle lever 13 in the foregoing embodiment, it is apparent that the engine throttle can be actuated by a servo motor or the like which is actuated by a dial rotary switch.

In the foregoing embodiment, while the target steering motor speed ratio $E_S'$ which corresponds to the steering lever displacement θ is multiplied by the actual engine revolution speed $n_E$ for obtaining the target steering motor revolution speed $N_S$, it is apparent that the actual engine revolution speed $n_E$ may be replaced by the target engine revolution speed $N_E$ and the target steering motor speed ratio $E_S'$ is multiplied by the target engine revolution speed $N_E$. Also, it is evident that the target steering motor revolution speed, which is proportional to the actual engine revolution speed $n_E$ or the target engine revolution speed $N_E$, can be obtained directly from the steering lever displacement θ, without using the target steering motor speed ratio $E_S'$ corresponding to the steering lever displacement θ.

Although the steering lever 14 and the forward/reverse drive switch lever 15 are separately formed in the foregoing embodiment, they may be formed as one unit. Such a forward/reverse drive switch steering lever is designed to be moved to the right and left at each of the forward position F, neutral position N and reverse position R. Further a steering handle may be employed instead of the steering lever 14.

Although the present invention has been particularly described with one steering motor 80 of the so-called hydrostatic type which can be forwardly and reversely rotated by the engine 21 through the steering pump 86, the steering motor may be provided for each of the crawler belts 5. Further, the hydrostatic steering motor can, of course, be replaced by an electric steering motor which is actuated by an engine through a generator.

Although the present invention has been particularly described with the hydrostatic-mechanical transmission called "non-stage transmission", it is readily apparent that the invention can be applied to similar non-stage transmissions such as hydrostatic transmissions and belt-type transmissions.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A steering control system for use in a track-laying vehicle comprising:
   (a) a rotary power source;
   (b) a steering motor driven by the rotation of the power source for driving crawler belts provided at both sides of the vehicle such that a relative travel difference results between the crawler belts, thereby turning the vehicle rightwards or leftwards;
   (c) steering instructing means which can be displaced from a neutral position by operation and which instructs, according to the direction and distance of the displacement of the steering instructing means, a turning direction and a turning radius for the vehicle, the turning radius decreasing as the displacement distance increases;
   (d) displacement detector means for detecting the displacement of the steering instructing means; and
   (e) steering motor revolution speed control means for obtaining a target steering motor revolution speed which is made proportional to the revolution speed of the power source based on the displacement of the steering instructing means detected by the displacement detector means and controlling the revolution speed of the steering motor with the target steering motor revolution speed.

2. The steering control system for use in a track-laying vehicle as set forth in claim 1, which further comprises power source revolution speed detector means for detecting the actual revolution speed of the power source and wherein the steering motor revolution speed control means obtains a target steering motor revolution speed which is made proportional to the actual revolution speed of the power source detected by the power source revolution speed detector means, based on the displacement of the steering instructing means detected by the displacement detector means.

3. The steering control system for use in a track-laying vehicle as set forth in claim 2, wherein the steering motor revolution speed control means obtains the target steering motor revolution speed which is made proportional to the actual revolution speed of the power source detected by the power source revolution speed detector means, based on the displacement of the steering instructing means detected by the displacement detector means, by first obtaining a target steering motor speed ratio which is the ratio of a revolution speed of the steering motor to the revolution speed of the power source based on the displacement of the steering instructing means, and then the target steering motor speed ratio is multiplied by the actual revolution speed of the power source.

4. The steering control system for use in a track-laying vehicle as set forth in claim 3, wherein the revolution speed of the power source for the target steering motor speed ratio, which is the ratio of the revolution speed of the steering motor to the revolution speed of the power source, is any one of a set target revolution speed and the actual revolution speed of the power source detected by the power source revolution speed detector means, and the revolution speed of the steering motor is the target revolution speed.

5. The steering control system for use in a track-laying vehicle as set forth in claim 1, wherein the steering motor revolution speed control means obtains a target steering motor revolution speed which is made proportional to a target revolution speed set for the power source, based on the displacement of the steering instructing means detected by the displacement detector means.

6. The steering control system for use in a track-laying vehicle as set forth in claim 5, wherein the steering motor revolution speed control means obtains a target revolution speed set for the steering motor which is made proportional to a target revolution speed set for the power source, based on the displacement of the steering instructing means detected by the displacement detector means, by first obtaining a target steering motor speed ratio which is the ratio of a revolution speed of the steering motor to the revolution speed of the power source based on the displacement of the steering instructing means, and then the target steering motor speed ratio is multiplied by the set target revolution speed for the power source.

7. The steering control system for use in a track-laying vehicle as set forth in claim 1, wherein the steering motor revolution control means obtains a target revolution speed set for the steering motor by first obtaining a target steering motor speed ratio which is the ratio of a revolution speed of the steering motor to the revolution speed of the power source based on the displacement of the steering instructing means detected by the displacement detector means, and then the revolution speed of the power source is made proportional to the target steering motor speed ratio.

8. The steering control system for use in a track-laying vehicle as set forth in claim 7, which further comprises power source revolution speed detector means for detecting the actual revolution speed of the power source, and wherein the steering motor revolution speed control means obtains a target steering motor revolution speed by multiplying the target steering motor speed ratio by the actual revolution speed of the power source detected by the power source revolution speed detector means to make the revolution speed of the power source proportional to the target steering motor speed ratio.

9. The steering control system for use in a track-laying vehicle as set forth in claim 7, wherein the steering motor revolution speed control means obtains a target steering motor revolution speed by multiplying the target steering motor speed ratio by the target revolution speed set for the power source to make the revolution speed of the power source proportional to the target steering motor speed ratio.

10. The steering control system for use in a track-laying vehicle as set forth in any one of claims 5, 6, 9 or 4, which further comprises throttle position detector means for detecting the position of a throttle with respect to the power source and wherein a target revolution speed for the power source is set according to the throttle position detected by the throttle position detector means.

11. The steering control system for use in a track-laying system as set forth in claim 6 or 7, which further comprises power source revolution speed detector means for detecting the actual revolution speed of the power source, and wherein the revolution speed of the power source for the target steering motor speed ratio, which is the ratio of a revolution speed of the steering motor to the revolution speed of the power source, is either a set target revolution speed or the actual revolution speed of the power source detected by the power source revolution speed detector means, and the revolution speed of the steering motor is the target revolution speed.

12. The steering control system for use in a track-laying vehicle as set forth in claim 11, which further comprises throttle position detector means for detecting the position of a throttle with respect to the power source and wherein a target revolution speed for the power source is set according to the throttle position detected by the throttle position detector means.

13. The steering control system for use in a track-laying vehicle as set forth in any one of claims 1, 2, 3, 5, or 6 to 9 wherein the steering motor is rotated in forward and reverse directions, thereby driving the crawler belts at the same speed in different directions such that a relative travel difference results between the crawler belts.

14. The steering control system for use in a track-laying vehicle as set forth in claim 13, wherein the steering motor is any one of a hydrostatic steering motor and an electric steering motor.

15. The steering control system for use in a track-laying vehicle as set forth in any one of claims 1, 2, 3, 5, or 6 to 9, wherein the rotary driving force of the power source is transmitted through a non-stage transmission such that the crawler belts are driven at the same speed in the same direction, thereby driving the vehicle forwards or backwards.

16. The steering control system for use in a track-laying vehicle as set forth in claim 15, wherein the non-stage transmission is any one of a hydrostatic-mechanical transmission, a hydrostatic transmission and a belt-type transmission.

17. The steering control system for use in a track-laying vehicle as set forth in any of one of claims 1, 2, 3, 5, or 6 to 9, wherein the steering instructing means is any one of a steering lever and a steering handle.

* * * * *